(12) United States Patent
Linquist et al.

(10) Patent No.: US 8,140,052 B2
(45) Date of Patent: Mar. 20, 2012

(54) ROAMING METHOD WITH CALL ANNOUNCEMENT

(75) Inventors: Roger Linquist, Dallas, TX (US); J. Braxton Carter, Plano, TX (US); Phillip Terry, Dallas, TX (US); Gregory Pressly, Plano, TX (US)

(73) Assignee: Metropcs Wireless, Inc., Richardson, TX (US)

( * ) Notice: Subject to any disclaimer, the term of this patent is extended or adjusted under 35 U.S.C. 154(b) by 862 days.

(21) Appl. No.: 12/024,870

(22) Filed: Feb. 1, 2008

(65) Prior Publication Data

US 2008/0254764 A1 Oct. 16, 2008

Related U.S. Application Data

(60) Provisional application No. 60/888,886, filed on Feb. 8, 2007.

(51) Int. Cl.
*H04M 11/00* (2006.01)
(52) U.S. Cl. .......................... 455/406; 455/405; 455/407
(58) Field of Classification Search .................. 455/406, 455/405, 407, 410, 411, 432.1, 432.3, 433, 455/425, 445, 525; 379/114.2; 705/7, 10, 705/35
See application file for complete search history.

(56) References Cited

U.S. PATENT DOCUMENTS

| | | | | |
|---|---|---|---|---|
| 6,212,506 | B1 * | 4/2001 | Shah et al. | 705/418 |
| 6,782,258 | B2 * | 8/2004 | Ung et al. | 455/432.1 |
| 2002/0025809 | A1 * | 2/2002 | Ung et al. | 455/432 |
| 2004/0053618 | A1 * | 3/2004 | Leppanen et al. | 455/445 |
| 2006/0178918 | A1 * | 8/2006 | Mikurak | 705/7 |
| 2008/0188218 | A1 * | 8/2008 | Sherman et al. | 455/432.1 |
| 2008/0293402 | A1 * | 11/2008 | Rajan et al. | 455/425 |
| 2009/0154675 | A1 * | 6/2009 | Hanson | 379/114.2 |

* cited by examiner

*Primary Examiner* — Jean Gelin
(74) *Attorney, Agent, or Firm* — Howison & Arnott, L.L.P

(57) ABSTRACT

A method is disclosed for completing a roaming cellular call between a roaming subscriber and another party. The first step is initiating the roaming call between the roaming subscriber and the another party. The roaming subscriber is provided with a prepaid debit account. The roaming subscriber is then connected to a cellular network when a connection between the subscriber and the another party is to be made such that a call has been built over a calling network. The prepaid debit account of the roaming subscriber is then examined to determine the balance thereof, and then the roaming subscriber is informed of financial information regarding the call connection prior to connecting the roaming subscriber to the another party over the already built call.

39 Claims, 27 Drawing Sheets

ROAMING METHOD WITH CALL ANNOUNCEMENT

CROSS-REFERENCE TO RELATED APPLICATIONS

This application claims the benefit of Provisional Patent application No. 60/888,886, entitled ROAMING METHOD WITH CALL ANNOUNCEMENT.

TECHNICAL FIELD

The present invention pertains in general to cellular telephone systems and, more particularly, to systems to facilitate roaming of mobile subscribers in different carrier locations.

BACKGROUND

In order to allow a mobile telephone such as a cellular telephone to obtain the maximum amount of mobility, the concept of "roaming" had been conceived, since most cellular telephone service providers had only a limited infrastructure and, thus, could only provide limited "direct" coverage for their subscribers. In roaming, a home system identifier code is stored in the mobile telephone's memory which allows it to compare the home system identifier code to the system identifier code which is transmitted on the serving control channel. If they do not match, this means the subscriber is operating in a visited system and the mobile telephone will provide a ROAM indicator. The ROAM indicator is typically used by a subscriber to determine if billing rates have changed. Visited systems often charge a premium for service usage. In the early days of roaming, the roaming charges were controlled by the visiting system. Typically, this visiting system would recognize that the system was not part of the associated Home Location Register (HLR) and it would then look in the Visiting Location Register (VLR) to determine if the visitor had previously been registered. If not, then the visited carrier would contact the HLR of the mobile telephone's home system (determined from information provided by the mobile telephone) to register that phone therewith for the purposes of receiving incoming calls. However, third party roaming platforms have been developed that more efficiently address roaming needs of mobile users. These roaming platforms are actually responsible for building the call and they are accessed by the mobile telephone inputting information to the visited carrier that indicates a preferred roaming platform. Once this is indicated, the visited carrier hands off the call to the designated roaming platform and then the designated roaming platform is responsible for determining the roaming charges, billing, accepting the responsibility for the services, etc.

In recent years, pre-paid service plans have been offered to many subscribers. In these pre-paid service plans, unlimited local calls is typically provided for outgoing calls from an in-home carrier and even unlimited long distance calls. Roaming is sometimes also facilitated but this is typically offered through a list of preferred roaming platforms in a Preferred Roaming List (PRL) stored in the phone. Thus, when a user is outside of the home network, a call must be placed through a roaming carrier. In these pre-paid systems, however, the only way to facilitate charging a customer for non-standard (out of plan) charges is to have a pre-paid account that has a balance that can be replenished by the subscriber. The reason for this is that these pre-paid services typically do not send a bill out to the end customer; rather, all of the services are paid for ahead of time. As such, there must be a way to determine if a subscriber is active and if they have sufficient funds in a pre-paid account to cover roaming charges. Thus, when the roaming platform is contacted, they will have to address the sufficiency funds issue. However, when a call is constructed, i.e., when it is determined that a particular subscriber is an active subscriber, billing is immediately initiated to the home network carrier. The problem with this is that, if it is determined that the subscriber is active, but they do not have sufficient funds, they will be terminated and the home carrier will be charged with the amount of time required to make such a determination. This is also the case with respect to a mobile subscriber calling an unanswered phone. It must first be determined that the active subscriber in a roaming mode is authenticated and, if authenticated, then the call is allowed to go through, at which time the billing starts. However, if the call goes unanswered, home carriers will typically absorb the cost for those few tenths of a second or seconds for the called phone to ring.

One disadvantage to current roaming systems, especially those with respect to pre-paid accounts, is that the user has no knowledge of the account balance other than accessing their account directly and looking at the balance. However, when the user makes a call, there is typically no knowledge of the roaming charges or the account balance.

SUMMARY

In one aspect thereof, is disclosed a method for completing a roaming cellular call between a roaming subscriber and another party. The first step is initiating the roaming call between the roaming subscriber and the another party. The roaming subscriber is provided with a prepaid debit account. The roaming subscriber is then connected to a cellular network when a connection between the subscriber and the another party is to be made such that a call has been built over a calling network. The prepaid debit account of the roaming subscriber is then examined to determine the balance thereof, and then the roaming subscriber is informed of financial information regarding the call connection prior to connecting the roaming subscriber to the another party over the already built call.

In another embodiment, the cellular network includes a first carrier having a first geographical coverage area and a second carrier having a second geographic coverage area. A method of completing a roaming call placed by a subscriber of the first carrier while in the second geographic coverage area includes the step of receiving notification of a call placed by the subscriber within the second carrier's geographical coverage area from the second carrier. The subscriber has a prepaid debit account. The subscriber is identified as a valid subscriber of the first carrier. The call is built and a billing rate for the call is determined. The balance of the subscriber's prepaid debit account is determined and message informing the subscriber of financial information regarding the call connection prior to connecting the subscriber over the already built call is transmitted to the subscriber.

In another embodiment, a method of completing a roaming call from a subscriber of the first carrier placed from within the geographic coverage area of the second carrier is provided. A call is received from the subscriber at a mobile switching center of the second carrier. The subscriber has a prepaid debit account. A roaming platform is notified of the call placed by the subscriber from within the second carrier's geographical coverage area. A communication is received from the roaming platform that the call is accepted. A message is transmitted from the roaming platform informing the subscriber of financial information regarding the call connection before the subscriber's call is connected.

In another aspect thereof, a method of facilitating roaming calls between roaming subscribers of a cellular provider and other parties is disclosed. A roaming platform is selected to process roaming calls between subscribers of the cellular provider and other parties. Valid subscribers having a prepaid debit account of the cellular provider are identified to the roaming platform. The roaming platform transmits a message to roaming subscribers with financial information regarding roaming calls prior to connecting subscribers' roaming calls over the calling network.

In another embodiment, a method of completing a financial transaction using a cellular network is disclosed. A call is built to a selected subscriber's calling device. The subscriber has a debit account with a cellular provider. A message is transmitted to the cellular subscriber's calling device providing the subscriber with information regarding a financial transaction. The subscriber is provided the option of accepting the financial transaction by means of transmitting a code from the subscriber's calling device. A response is received from the subscriber indicating whether the subscriber accepts or rejects the financial transaction. The subscriber is connected to the call if the subscriber accepts the financial transaction.

In yet another embodiment, a method of advertising using a cellular network is disclosed. A call is built to one or more selected subscribers having a debit account. A message is transmitted to the cellular subscriber's calling device providing the subscriber with information regarding the call wherein the subscriber is provided the option of accepting the call by means of transmitting a code from the subscriber's calling device. A response is received from the subscriber indicating whether the subscriber accepts or rejects the call. The subscriber is connected to the already built call if the subscriber accepts the financial transaction. The call comprises advertising and provides the subscriber with an incentive if the subscriber accepts the call.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
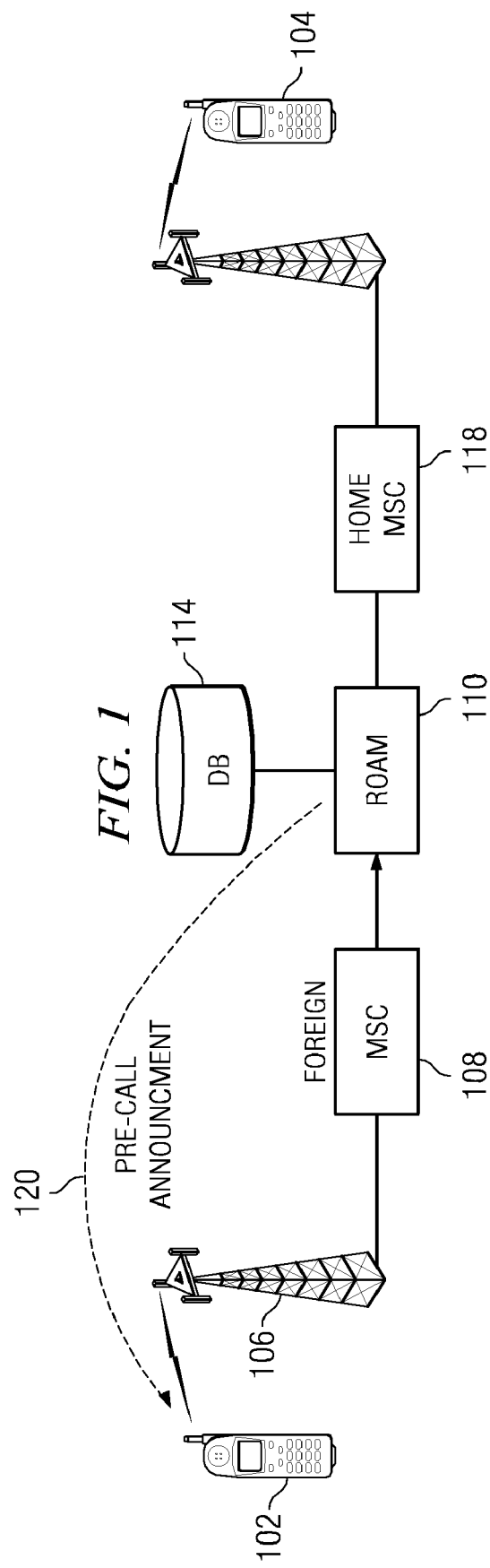
FIG. 1 illustrates an overall diagram of the use of a roaming platform in a roaming situation.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated a diagrammatic view of a cellular network system wherein a subscriber with a subscriber handset 102 is roaming on a system and desires to call a recipient's handset 104 on, for example, a home network of the subscriber. Of course, this is by example only and this scenario would work for calling any recipient, either a land line or a mobile user on any network, the only requirement being that they have a terminating number on the telephone network.

In a roaming situation, the handset of the originator of the call, the handset 102, is connected to a base station 106 in the area in which the handset 102 currently resides, i.e., the one with a cellular telephone base station within the reception/transmission area of the handset 102. As will be noted herein below, it is possible that multiple base stations could be within range of a particular handset and it could be that one or more of these base stations are operated by different carriers. As will further be described herein below, the handset 102 will select the particular carrier based upon preferred roaming platform, and the base station for that carrier having a preferred roaming platform will be selected based upon signal strength, as it is well known that the handset could actually communicate with multiple base stations, the one eventually connected to the handset being the one with an available channel and providing the maximum signal strength, i.e., typically the closest one.

The base station 106 is associated with a Mobile Switching Center (MSC) 108 associated with the foreign carrier, or out of network carrier. This MSC 108 typically has associated therewith the out of network HLR which has contained therein information regarding subscribers for that particular network. It will also have a Visitor Location Register (VLR) which will contain information regarding authorized visitors to the system. This VLR provides a copy of information that is contained in the subscriber's HLR back at their home network. This facilitates faster access. However, in a roaming situation in accordance with the present disclosure, the handset 102 will transmit the code of a preferred roaming platform 110 wherein the call will be handed off from the visited MSC 108 associated with the out of network carrier to the roaming platform 110. The roaming platform 110 will then verify that the handset 102 has a valid access account associated with that roaming platform. Typically, the roaming platforms will have a database 114 associated therewith which contains sufficient information to allow a connection to be made. For pre-paid customers, all that is required is that there be a pre-paid account, an indication of the balance in that account and some connection with their home network. This enables the account to be "dipped" to extract the funds necessary to make the roaming connection. Once verification has been made that sums are available in the account, the roaming platform 110 will then "build" a call to connect the handset 102 to the recipient handset 104 via, in this example, a home MSC 118 of recipient 104. This could actually be the home MSC of the originator at the handset 102 or a connection to the PSTN. However, this handset 104 could be on any network and, in fact, it could be on the network associated with MSC 108. All that is important is that the call be connected through the roaming platform 110 to some terminal number on the network and that there be some type of access to accounts and some database associated with the handset 102 or associated therewith in the database 114.

As will further be described herein below, there is a billing transaction that occurs whenever a call is made. This billing transaction is based upon when the call is connected from the foreign carrier to a roaming platform, i.e., the handset is placed in communication with the roaming platform. At this instant, the home carrier indicates to the roaming platform 110 through either prestored data at the roaming platform or through interface with roaming platform 110 that the user is a valid user, i.e., has an active account. Once the roaming platform 110 determines this, it indicates to the foreign carrier that the account is active, i.e., the subscriber is a valid subscriber, at which time billing is initiated to the home network carrier of that subscriber. It is up to that home network carrier as to whether it passes this cost on to a subscriber. However, as will be described herein below, there is a further process by which the roaming platform determines the roaming charges and/or the balance in the account, and then conveys this information to the originating handset 102, as they are the subscriber, to allow them the option of not going forward with a call. If they do not go forward with the call, then the subscriber is not billed. This is called a pre-call announcement which is indicated by path 120, indicating that information is sent back to the handset 102 of the subscriber in the roaming mode. As such, the first benefit this provides to the roaming user is information regarding the fact that the roaming charges are at a certain level and/or, that there is a certain balance left. This balance could be sent in dollars or it could be sent in minutes. Of course, when the pre-paid account has been debited to the full amount of the original funds available, then the call will be torn down by the roaming platform 110, i.e., it will be terminated. The second benefit to the subscriber is that they will not have their pre-paid account debited for this time Referring now to FIG. 2, there is illustrated a diagrammatic view of a roaming user 202 in an out of network carrier region 204. The concept of an in network or a home network is a concept wherein a subscriber has full access to all base stations that are connected to a particular network, even though they may be in different areas. In this depiction, there is provided a first network 206, second network 208 and a third network 210, all geographically distinct but associated with a common cellular telephone carrier, such that each must have its own mobile switching center or be connected to a central mobile switching center. The only important thing to note is that each of these regions 206-210 have associated therewith base stations that, once accessed by a subscriber, allow the subscriber to operate "in-plan." Typically, this subscriber in the disclosed embodiments herein is involved in a pre-paid plan. This pre-paid plan allows the user unlimited calling within the network in which they subscribe, i.e., the in network regions. They also are allowed to, in some versions of the plan, access a long distance call when made from base stations within the network. The problem exists when a particular user exits the network. In pre-paid plans, there may be roaming allowed but, usually, roaming is not part of the pre-paid plan, but such plans could be constructed. For the purposes of the disclosed embodiments described herein, roaming is not part of the pre-paid plan and a pre-paid account must be maintained for a subscriber to access roaming features. For a typical non pre-paid plan, the carrier will bill the subscriber at a later time for roaming charges. With a pre-paid plan, bills are typically not sent out to the subscriber; rather, the subscriber comes into an office and pays a fixed amount on their phone which provides for unlimited calls "within" the network for a predetermined period of time. Any additional services, charges, etc., must be accounted for in a different way. These additional features, and the provision thereof, are facilitated with a pre-paid account, referred to as a SmartPay account. This is an account that the user can "dip in" to when necessary. For example, in a roaming situation, the user would access an out of network carrier and the base station associated therewith for the purpose of placing a call. They would be charged on a per minute basis, but this charge would come directly out of their pre-paid account until the account were depleted, at which time the call would be terminated.

Figure 2:
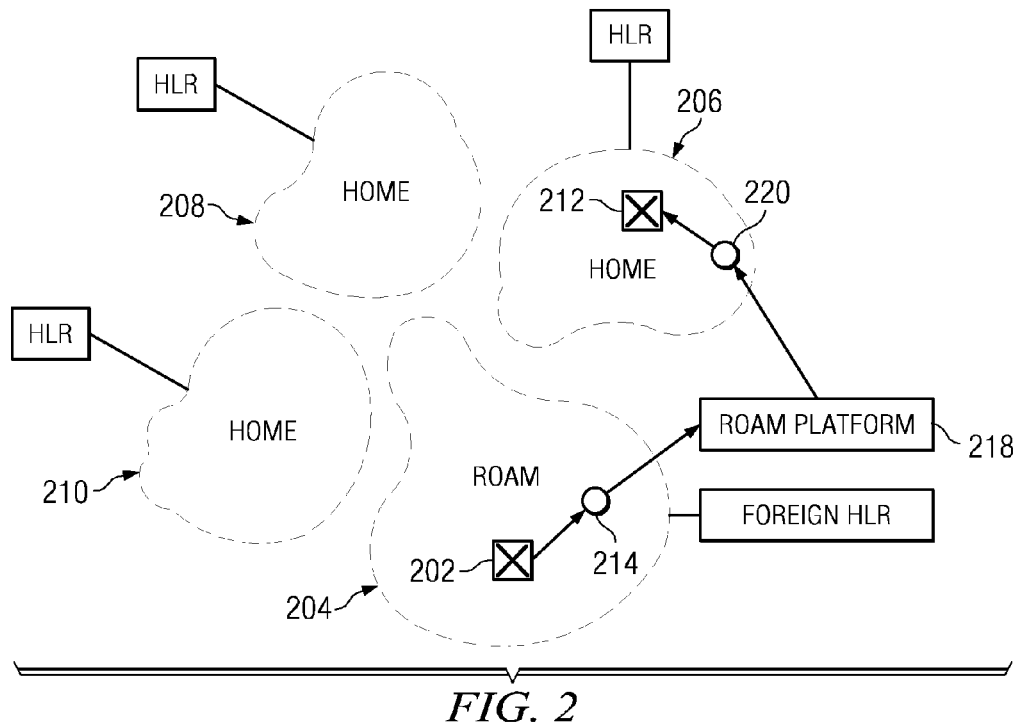
FIG. 2 illustrates a diagrammatic view of multiple home regions and a roaming region.

Illustrated in FIG. 2 is a call that is made from the roaming area 204 by the roaming subscriber 202 in order to access a recipient 212 in the region 206. This would require the originating caller at the originator device handset 202 to place a call to the MSC 214 in the region 204 or associated therewith. This would then be routed to the preferred roaming platform (this predefined in handset 202) [218] which would then operate in accordance with FIG. 1 and complete the call to the handset 212 through the MSC 220 of the region 206. It should be understood that there could be one single MSC for all of the regions 206, 208 and 210 and there could be separate HLRs or a common HLR for each of those regions. However, for an outbound call from the handset 202, the HLRs are not necessary. The only purpose of the HLR is that, when the handset 202 makes the first call, there will be a registration made in both the foreign VLR associated with the region 204 and the HLR associated with the user at their home network for the purpose of maintaining registration of their "whereabouts" to facilitate inbound calls to the subscriber.

Figure 3:
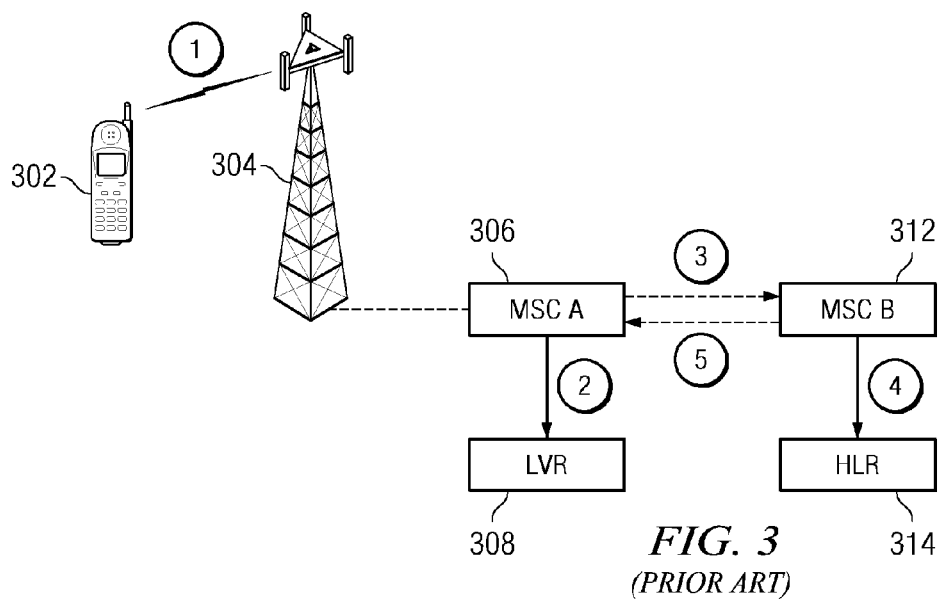
FIG. 3 illustrates a prior art configuration for roaming without the roaming platform.

Referring now to FIG. 3, there is illustrated a prior art depiction of roaming without using the roaming platform. In this embodiment, handset 302 performs the first step of the operation by making a call. It accesses the base station within its transmission/reception radius, this being the base station 304. Once access to the base station is made, the base station interfaces with its associated MSC 306 (MSC A) which then checks its local visitor location register (VLR) 308 in order to determine if this particular handset 302 has been previously registered with the VLR 308 of the out of network carrier. If not, then the MSC 306 of the out of network carrier must validate that the roamer is authorized to roam. This requires the out of network carrier to utilize the wireless telephones ID (phone number), in order to send a message to the wireless telephone's home system requesting validation. This uses the mobile identification number (MIN). The MSC 312 of the home system receives the signal and then compares the Electronic Serial Number (ESN) of the handset and the MIN to determine if this is a valid handset. If the subscriber proves to be valid, the MSC 312 of the home system receives the signal and then compares the ESN and MIN to determine if this is a valid handset. If the subscriber proves to be valid, then the HLR responds back to the MSC 302 with an indication that validation was successful. After the MSC 306 receives confirmation that the visiting wireless cell phone is valid, the call is then processed. The VLR 308 of the MSC 306 will then temporarily store the wireless telephones registration information to validate the subscriber's identity rather than requesting validation from the home system again for the next call. After a predetermined period of wireless telephone inactivity, the information stored in the VLR 308 will be erased. If the wireless telephone was recently operating in another cellular system, the home system informs the old visited system that the wireless telephone has left. This allows the old visited system to erase the wireless telephone's information at that time.

In addition to validating the call, there is also typically a step of authentication which confirms a wireless telephone's identity. This could be significant because roamer validation cannot detect illegally cloned telephones not owned by the authentic customer but containing duplicated information (wireless telephones). Two options which have been utilized in the past are: 1) A visited MSC can use a temporary key, or 2) The MSC can request the Authentication Center (AC) associated with the home system to validate wireless elements each time. There are many ways for this validation to occur in prior art systems, and will not be discussed herein in detail.

In this embodiment of FIG. 3, the MSC 306 is the vehicle that builds a call, i.e., they complete a call to another location. Thus, the home system has no interface with this operation. In order to provide for a pre-paid account for the services that can be decremented for each minute thereof after completion of the call, there would have to be some type of interface between the MSC 306 and the MSC 312 in order to facilitate such an operation. In the embodiment of FIG. 1, the roaming platform maintains the database and/or maintains the contact with the home network to facilitate this particular transaction of decrementing funds and tearing the call down when the funds are depleted. However, it may be difficult for a particular roaming partner to have this database available to it in the configuration of FIG. 3 and to provide the announcement back to the phone 302. Typically, this will be something that is carried out by the switch that is capable of tearing down the call after it has been placed.

Figure 4:
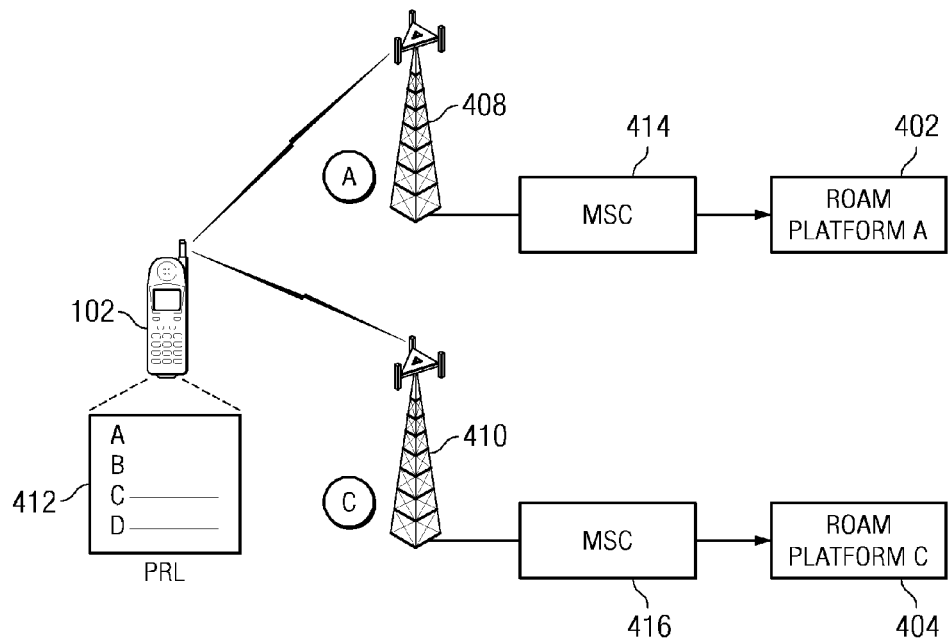
FIG. 4 illustrates a roaming handset with multiple visited carriers.

Referring now to FIG. 4, there is illustrated an embodiment for initiating the roaming operation. The handset 102, in this embodiment, can contact the base stations of two different carriers, each associated with a different roaming platform, a roaming platform 402 and a roaming platform 404. This is a situation wherein two different carriers are within range of the handset 102 but are associated with different roaming platforms. If the first carrier, associated with the base station 408, is associated with roaming platform 402, the question as to whether that carrier is selected or a second carrier is selected with the base station 410, is a function of the Preferred Roaming List (PRL) 412 that defines the order or priority of the home carrier authorized roaming platforms. The handset 102 will attempt to connect to the base station associated with a carrier having an association with a particular roaming platform.

In this embodiment there is disclosed a base station 408 in the first carrier interfacing with its MSC 414 and the roaming platform 402. The base station 410 interfaces with its MSC 416 and the roaming platform 404. In the roaming list 412, there is illustrated 4 different roaming platforms, labeled A, B, C and D. Roaming platform 402 is associated with the roaming provider A and the roaming platform 404 is associated with the roaming provider C. Therefore, the preferred roaming platform will be the roaming platform 402. Thus, the connection will be made through the MSC 414 in the preferred mode of operation.

Figure 5:
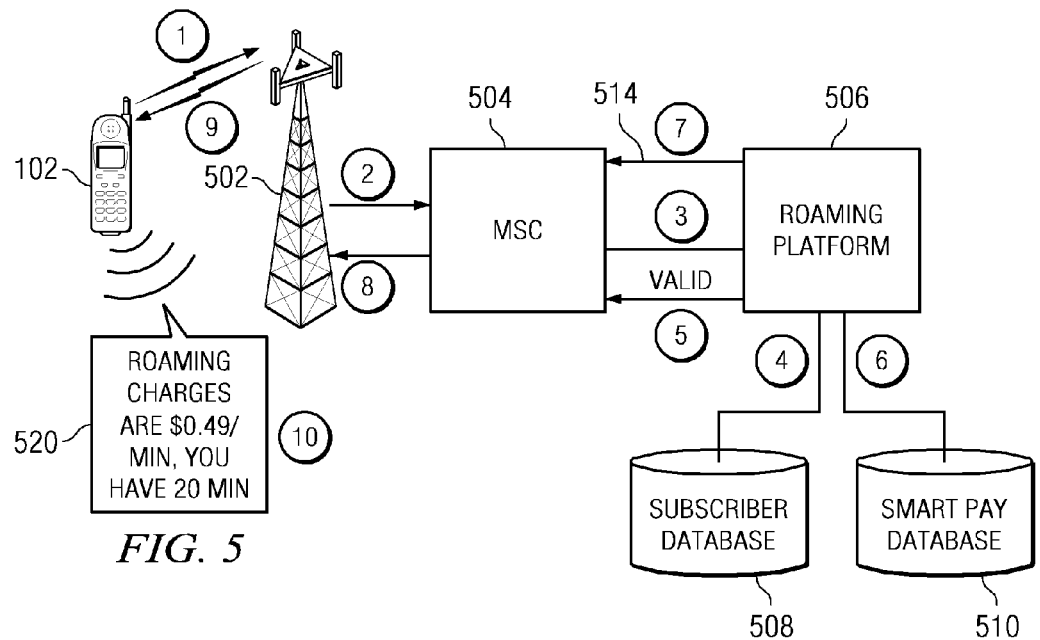
FIG. 5 illustrates a diagrammatic view of the roaming operation with access to the funds database.

Referring now to FIG. 5, there is illustrated a block diagram of the operation of interfacing with the roaming platform. The handset 102, in a first step, will make a connection with a base station 502 which will then interface with its MSC 504. The MSC 504 will receive the phone number of the handset 102 and also information regarding the roaming platform that it is associated with. As a note, if a handset has no roaming platform and it does not have valid access to a roaming platform through its home network, i.e., the carrier to which the handset 102 is interfaced is not a roaming partner of the home network, then the out of network carrier has the option of requesting credit card information from the user for the purpose of completing a call. Alternatively, there is a central out of network roaming platform that can be utilized, i.e., the carrier will forward this call to the out of network roaming platform which will then interface with the user to obtain credit card information or some other type of payment.

When the preferred roaming platform is defined, the MSC 504 will recognize this and immediately hand this off to a roaming platform 506. The roaming platform will receive the phone number, i.e., the ID of the requesting handset 102 and the ESN (Electronic Serial Number) of the phone. (It should be understood that there is a great deal of overhead associated with any wireless phone transaction, but which has not been described herein for simplicity purposes). There will be a subscriber database 508 associated with the roaming platform 506. This is populated by the home network of the subscriber associated with the handset 102. The roaming platform 506 determines if this is a valid subscriber, i.e., if this number is being handled by the roaming platform 506. If so, then a valid indication is sent back to the MSC 504 indicating that the call is accepted. At this point in time, as will be described herein below, the MSC 504 will begin billing the roaming platform 506 or it will bill the home carrier. As noted herein above, the MSC 504 will interface with the home network to indicate to the home network the location of the handset. However, that is not needed to place the call through the roaming platform 506.

Once the user has been determined as being valid and the MSC 504, for its purposes, has initiated billing to the roaming platform 506 or to the home carrier, the roaming platform will then determine the roaming rates associated with the roaming service and then access a database 510, which basically contains the funds associated with the pre-paid account, which is associated with phone 102 in this disclosed embodiment. The pre-paid account funds have a balance which can be examined and then a determination made as to what the cost per minute is for the roaming services and how many minutes are available for use by the user based on their account balance. At this time, and prior to actually connecting the user to the requested recipient, the roaming platform 506 will send an announcement back to the user, indicated by a direction arrow 514. The MSC 506 has a call connected between the handset 102 and the roaming platform 506 and, therefore, the roaming platform 506 can directly contact the phone 102. In essence, the roaming platform 506 has built the call already, i.e., made the connection to the phone 102. It is this service that the MSC 504 is billing for. The announcement is indicated in a box 520 as being an announcement that "roaming charges are $0.49 min, you have 20 min of talk time available to you." This, of course, is an exemplary message and this message could be any type of message and any length. It could even be a text message. In the disclosed embodiment, it is an audible "whisper" that is directed only to the earpiece of the subscriber. Thereafter, if the subscriber does not terminate the call after a predetermined time out or does not press some button accepting it, the call will be torn down by the roaming platform 506. However, even though the call was not placed because the user decided that the charges were too high, the MSC 504 still bills the home network carrier and the roaming platform 506 will also bill a percentage of that time for its services. As will be described herein below, this cost will be absorbed by the home carrier. This is a service that they provide such that the pre-paid account is not debited unless specifically authorized by a subscriber.

Figure 6:
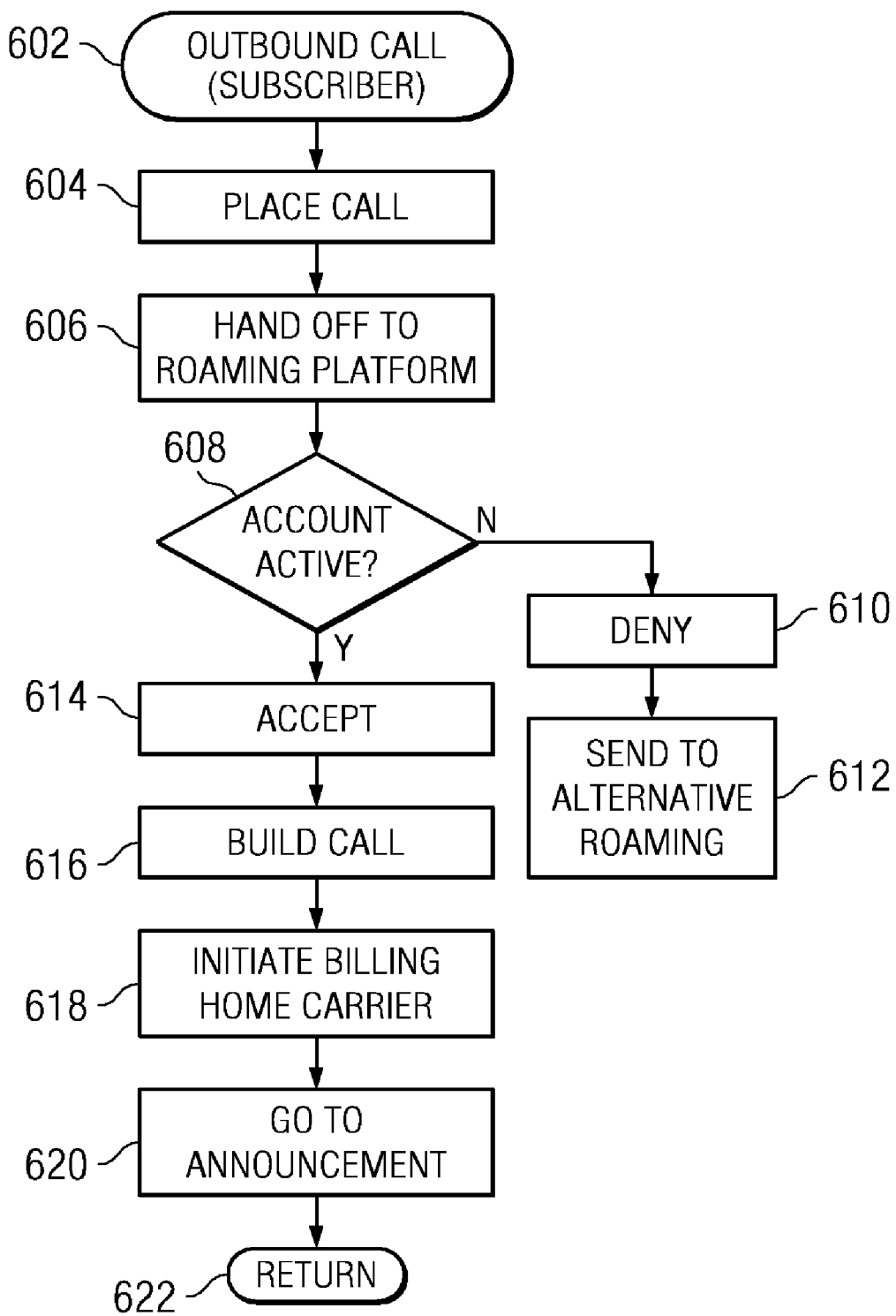
FIG. 6 illustrates a flow chart for an outbound call of a roaming subscriber.

Referring now to FIG. 6, there is illustrate a flow chart for the outbound call of a roaming subscriber. This is initiated at a block 602 and then proceeds to a block 604 wherein the call is placed. As noted herein above, this call is placed by sending to the out of network carrier base station information associated with the phone number, its ID (phone number), ESN, etc. Additionally, information is sent regarding the preferred roaming platform for which it is to be routed. The program then flows to a block 606 to hand off the call to the preferred or designated roaming platform. The roaming platform then takes over and determines if the account is active, as indicated by a decision block 608. If the account is not active, the roaming platform indicates this to the MSC with a denial of service, as indicated by block 610. All this indicates is that the roaming platform is denying roaming services to that particular handset for whatever reason. If this occurs, then the MSC handling the call can make a determination as to whether to just merely deny the call or to route this call to a third party roaming platform which is typically not associated with the home carrier of the subscriber, i.e., it is not a roaming partner of that home carrier. In this event, there can be no billing to the home carrier but, rather, this must be billed directly to the subscriber. This is typically done through an alternate roaming plan such as a credit card plan which requires credit card information from the subscriber to go forward with the roaming call. This is indicated by a function block 612. However, if the account is active, as determined by the roaming platform, the roaming platform will accept the call, as indicated by a function block 614. The roaming platform, since it has a prearranged contractual arrangement with the home network, has a list of all of the phone numbers that are associated with that particular home network, i.e., the telephone numbers typically. This is all that is required for the roaming platform to determine that this is an active account, i.e., that the originating caller has an association with one of the subscribing home networks. The roaming platform will then accept the call and then build a call between the roaming platform and the subscriber, as indicated by function block 616. This is the action wherein the MSC now has an indication that a call is active, i.e., it is the time at which billing is initiated to the home carrier. This billing could be directly from the MSC or through the roaming platform. This is unimportant; rather, what is important is the fact that billing is initiated and there is an active call and the subscriber is not yet aware of this nor are they billed for it at this point in time. This is indicated by function block 618. The program then flows to function block 620 to go to the announcement portion of the operation and then, after the announcement portion has been finished and the call is either terminated or connected to the recipient, the program flows to a Return block 622.

Figure 7:
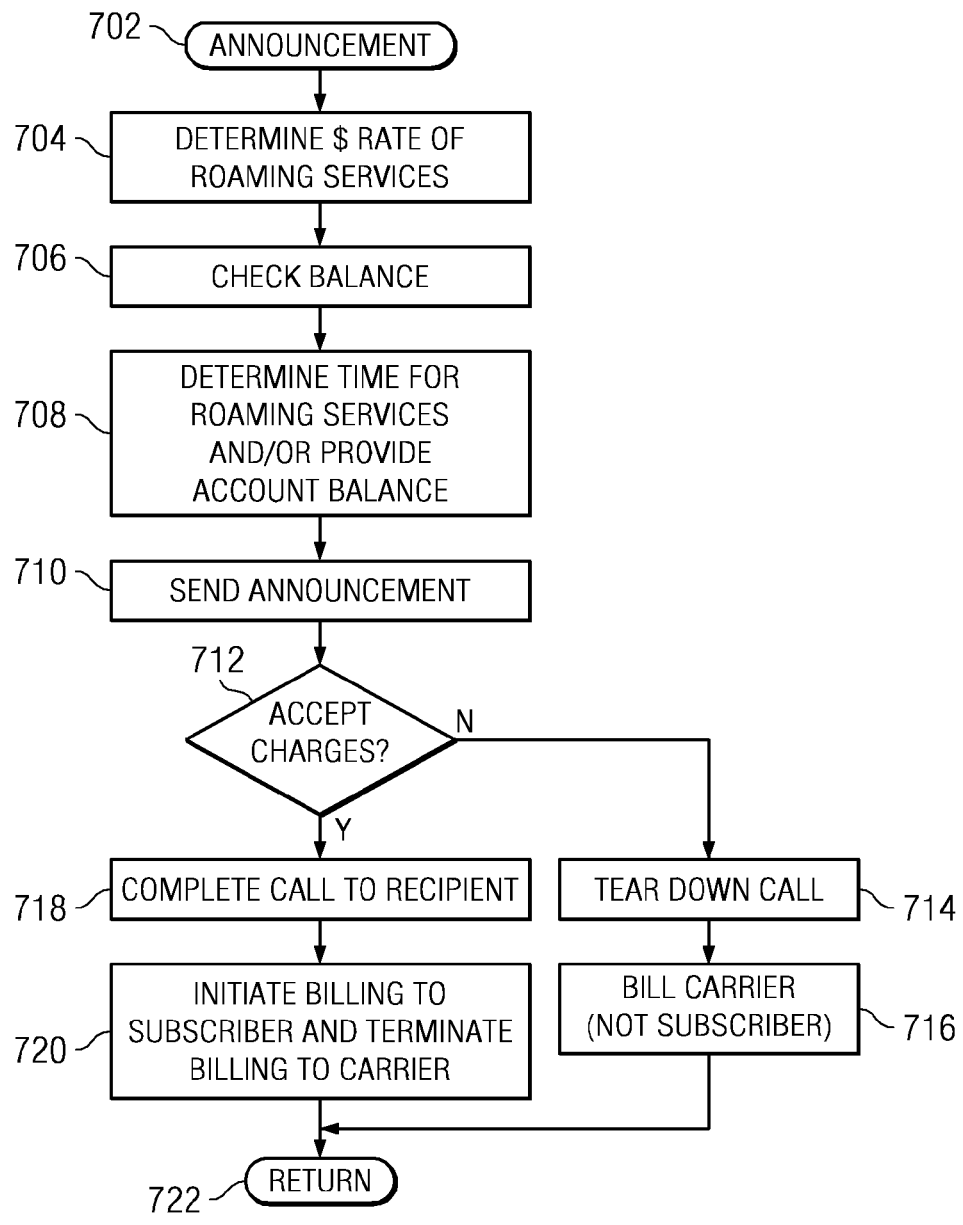
FIG. 7 illustrates a flow chart for the announcement feature.

Referring now to FIG. 7, there is illustrated a flow chart depicting the announcement portion of the flow chart, which is initiated at a block 702. The program then flows to function block 704 to determine the dollar rate of the roaming services that will be provided to the subscriber. This could be the same for all subscribers or it could be a function of a prearranged contractual number with the home network. Once the roaming rate has been provided, i.e., the dollars per minute for the call, then the roaming platform will check the balance in the pre-paid account, as indicated by function block 706. In the disclosed embodiment herein, this database is contained at the roaming platform and is populated by the home network. However, this database could be in any location that is accessible by the roaming platform. It is merely for efficiency purposes that the database would be maintained at the location of the roaming platform.

Once the balance has been checked, then the amount of time for the roaming services and/or the total account balance determined and assembled into a message, as indicated by function block 708. The program then flows to function block 710 to send this announcement to the subscriber. At this point, the call is opened and the home network carrier is being billed for this but, as will be described herein below, the subscriber is not being billed. When the user receives the announcement, it is typically in a whisper—an audible announcement. However, this could be a text message or any type of message. This could even be a series of blinking lights that represent various ranges of value, a gas gauge display, etc. It is merely that some type of information is sent to the user to indicate that they will be charged for the roaming, i.e., the roaming is at a certain rate per minute and/or there is a certain balance left in either dollars or minutes of use.

There are two ways to complete the transaction. The first is to determine if the charges are accepted as indicated by decision block 712. If not accepted, the program will flow to function block 714 wherein the roaming platform will tear down the call and then the flow will go to a function block 716 wherein the carrier will be billed and not the subscriber for the time to determine that the subscriber did not want to complete the call or debit his/her pre-paid account. However, if the user accepts the charges through either actively pressing some type of button or just maintaining the call for a predetermined amount of time, after the announcement is made, they will then be billed going forward from that point. The program will then flow along a "Y" path from decision block 712 to a function block 718 to complete the call to the recipient and then to a function block 720 wherein billing will be initiated to the subscriber and the un-reimbursed billing will be terminated to the carrier. Of course, all of the billing is to the carrier and the carrier makes the decision as to what portion of that is to be billed to the subscriber. The program then flows back to a return block 722, which is also the path flow from the block 716.

Figure 8:
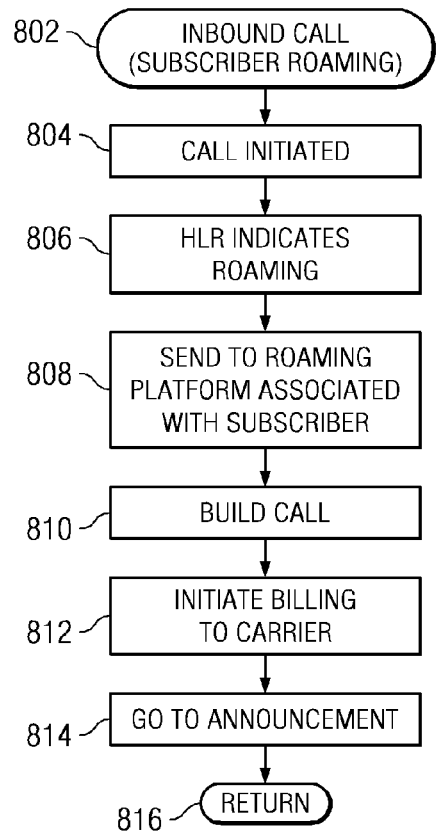
FIG. 8 illustrates a flow chart for an inbound call to a roaming subscriber.

Referring now to FIG. 8, there is illustrated a flow chart for an inbound call to a roaming subscriber. As noted herein above, any call to a prefix associated with a home network will be recognized by that home network and it's HLR. This information will be transmitted to the appropriate switches and routing made to the user's phone at the particular network on which the particular recipient subscriber resides. In prior art systems, if a subscriber had their phone on and they had roaming privileges, the phone call would come in under a roaming program and the user would be billed for that in accordance with that particular roaming program. However, in this embodiment, wherein pre-paid services are provided, there must be some provision for debiting their account.

The program is initiated at block 802 and a call initiated by a block 804 by an originator somewhere on the telephone network, this not necessarily being a subscriber. The program flows to function block 806 wherein the HLR indicates that the subscriber is roaming and the location of that roaming subscriber. The program then flows to function block 808 to send to the roaming platform associated with the subscriber the information necessary to build a call, as indicated by function block 810. The program then flows to a function block 812 to initiate billing to the carrier, i.e., this not billed to the subscriber at this time. The program then flows to the function block 814 to go to the announcement portion, as described herein above, with respect to the outbound call. The program then flows to a Return block 816.

Figure 9:
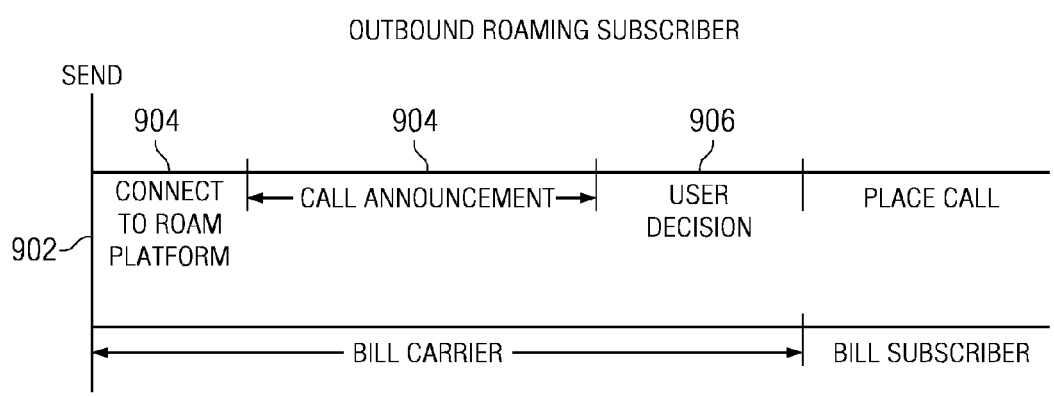
FIG. 9 illustrates a diagrammatic view of the billing of the call.

Referring now to FIG. 9, there is illustrated a diagrammatic view of the billing and connection operation to the outbound roaming subscriber. Initially, there is a Send operation at a line 902. On an upper horizontal line, there is provided the actual call operation. Initially, there will be a short amount of time indicated by a section 904 that will be required in order to access the roaming platform, waiting for the roaming platform to build a call, etc. Once the call has been built, then the user database is evaluated for the pre-paid amounts associated with that particular subscriber. A call announcement will be then made, as indicated by a section 906. As can be appreciated, the efficiency of this call announcement is of concern, as the carrier is paying for this call announcement, i.e., they are absorbing these minutes of use. The call announcement will be made and then there will be a period of time, usually in the order of 2 or 3 seconds, indicated by a section 906, in which a user can make a decision. If, at the end of this time, the user has not terminated the call, then the call will be placed. In the lower portion of the diagram of FIG. 9, it can be seen that the carrier is billed from the time the call is first built. Even though illustrated as being from the initial pushing of the Send button, there will, of course, be a short amount of time the MSC associated with the out of network carrier requires in order to connect to the roaming platform. However, for illustrative purposes, this portion is not shown. As such, the carrier is billed for the entire time up to the placing of the call, after which the subscriber is billed.

Figure 10:
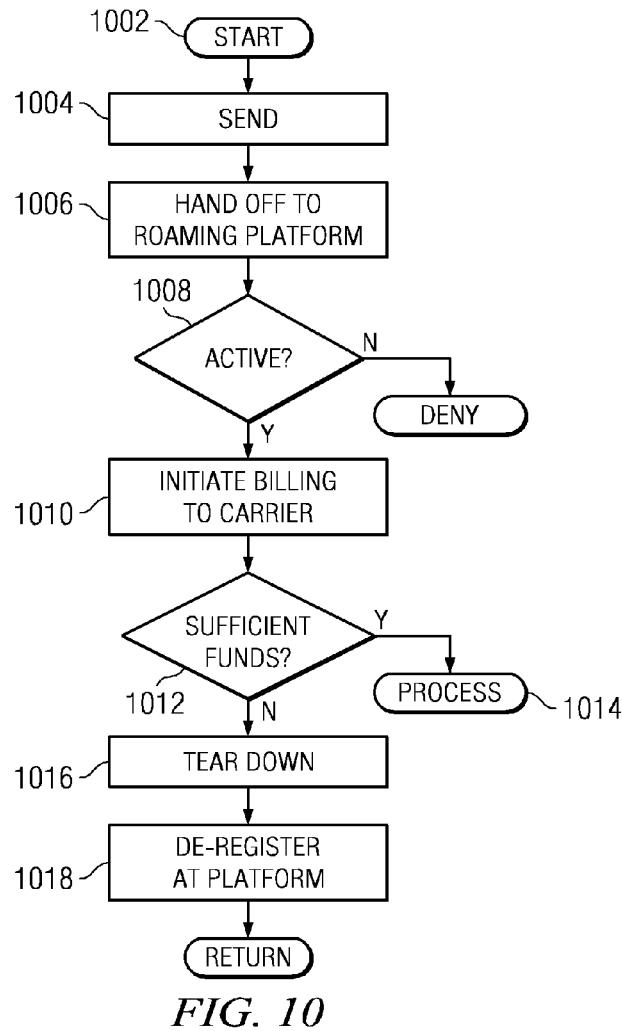
FIG. 10 illustrates a flow chart for the de-registration operation.

Referring now to FIG. 10, there is illustrated a flow chart depicting the operation of de-registering a call. It can be seen that there will be a short amount of time when the roaming platform recognizes the phone as an active number, but has no knowledge of the contents of the subscriber's funds. Until the roaming platform evaluates these, it will bill the home carrier for the time to evaluate the subscriber's pre-paid account. Thus, it is desirable that, after the roaming platform determines that the account balance is insufficient for roaming in a prior call, it will de-register that call from its database such that it will not accept a call to that phone number from that subscriber in the future until amounts have been re-deposited.

The program is initiated at a block 1002 and then proceeds to a function block 1004 for the Send operation, as described herein above. This, again, is handed off to the roaming platform, as indicated by function block 1006 and then the program flows to a decision block 1008 to determine if it is an active account. Initially, as the roaming platform does not have knowledge of insufficient funds, the roaming platform will indicate that this is an active account based solely on the phone number. The program will then flow along the "Y" path to function block 1010 in order to initiate billing to the carrier and then to a function block 1012 in order to determine if sufficient funds are contained therein. If so, the program flows along a "Y" path to a block 1014 to process it in accordance with the above noted procedures. However, in the event that there are insufficient funds in the user's pre-paid account, the program will flow along the "N" path to function block 1016 to tear down the call, i.e., terminate the call, and terminate billing. However, thereafter, it will de-register at the platform the user's number, as indicated by function block 1018. This will prevent future approval of the call by the roaming platform. Alternatively, and not shown, an informative message can be sent to the user that their account has been depleted and that they must dial a particular number in order to access their own network carrier to replenish the funds. However, after this announcement has been made, (although this is not shown in the flow chart), the de-registration is complete and future calls will be prohibited.

Figure 11:
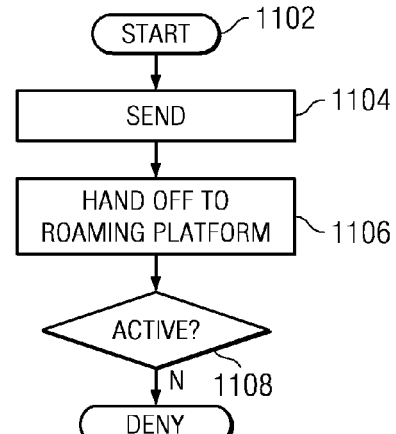
FIG. 11 illustrates the operation of the initiation of an outbound call from a subscriber followed by de-registration.

Referring now to FIG. 11, there is illustrated the operation wherein a second and subsequent call comes to a de-registered phone after de-registration. This is initiated at a block 1102 and then proceeds to a function block 1104 to perform the initial Send operation and then to function block 1106 to hand this off to the roaming platform and then to a decision block 1108 to determine if this is an active account. In this situation, it is determined to be an inactive account due solely to the fact that the phone number has been de-registered. Of course, the home network carrier for those particular prefixes is still associated with the roaming platform but this operation de-registers a particular phone number in the bank of phone numbers owned or serviced by that carrier. This prevents any billing of any time charges, since a call has never been built. This all occurs without evaluating the account, as the de-registration is an indication that the account is depleted.

Figure 12:
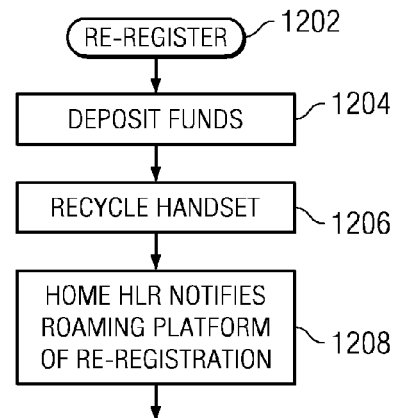
FIG. 12 illustrates a flow chart for the re-registration operation.

Referring now to FIG. 12, there is illustrated one operation wherein a re-registration occurs. This is initiated at a block 1202 and then proceeds to function block 1204 wherein funds are deposited by many different avenues into the pre-paid account. In this embodiment, which is not the preferred embodiment, a re-cycle of the handset may be required, as indicated by the function block 1206, in order to allow the handset to again force the roaming platform to access the HLR, at which time the HLR will indicate to the roaming platform that funds are now deposited, as indicated by function block 1208. However, in the preferred embodiment of the present disclosed system, a deposit of funds is automatically synched to the roaming platform such that the roaming platform will again re-register the user. This de-registration prevents multiple calls of a subscriber having a depleted account to the roaming platform, such that calls will not be authorized and, as such, even a small amount of time will not be billed to the carrier.

Figure 13A:
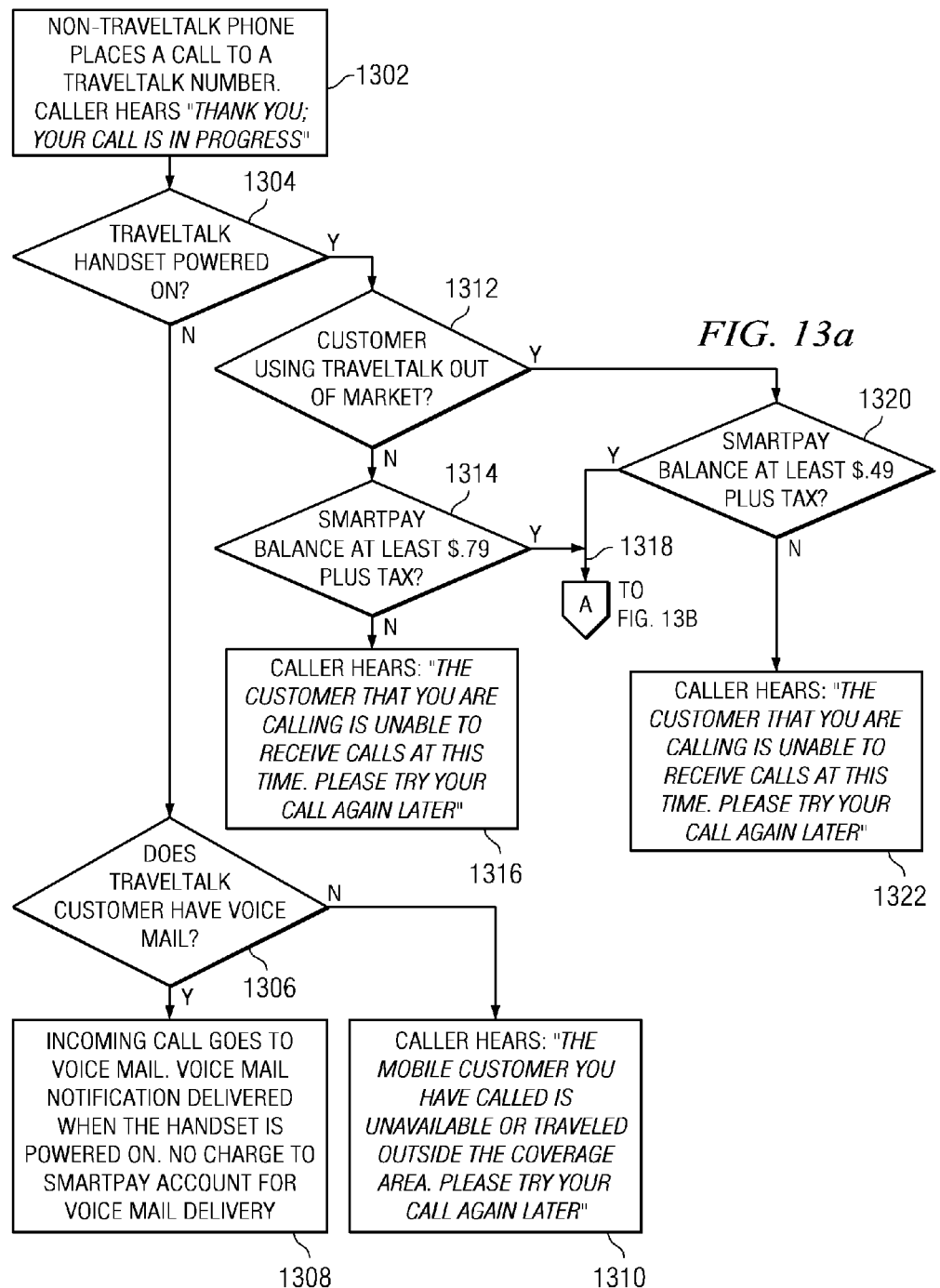
FIGS. 13a-13c illustrate the call connect operation for a roaming subscriber.
Figure 13B:
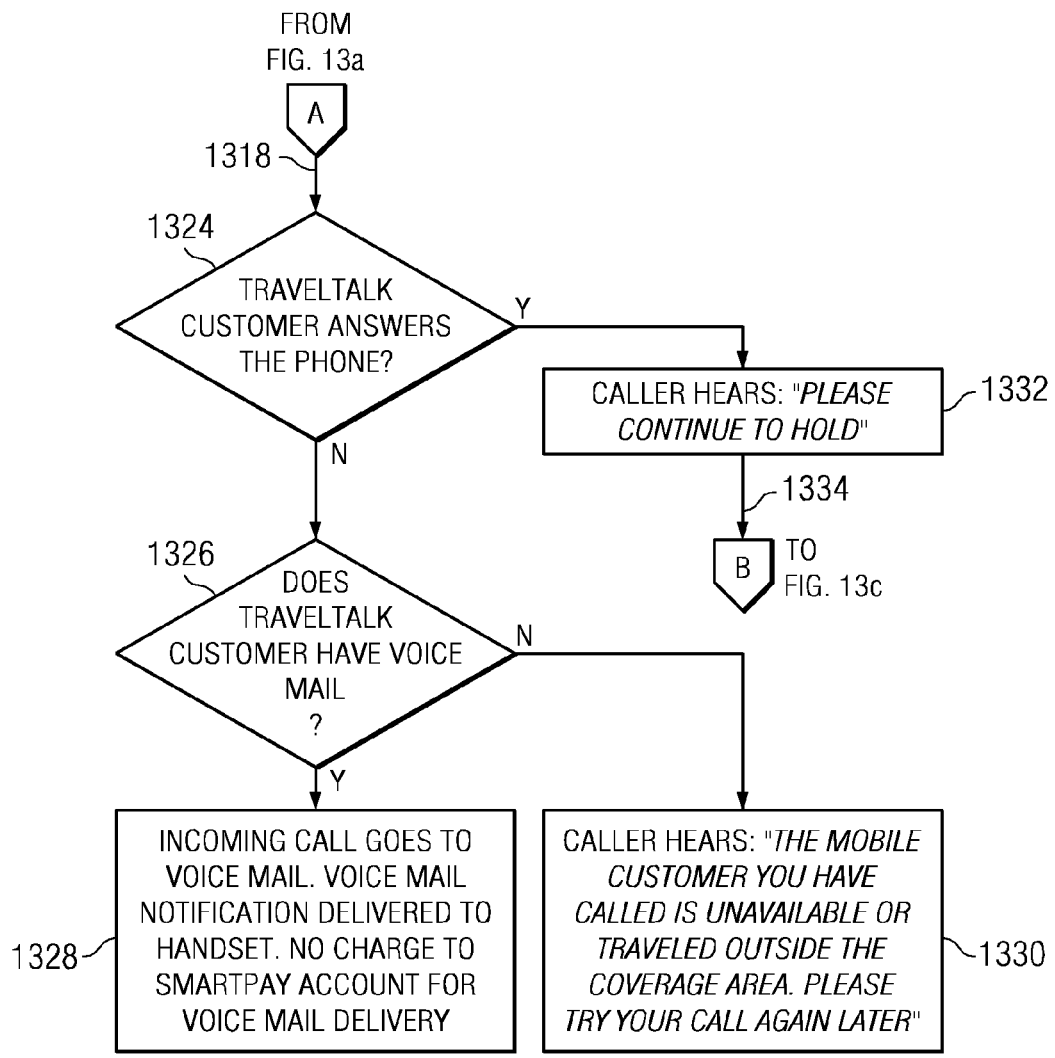
Figure 13C:
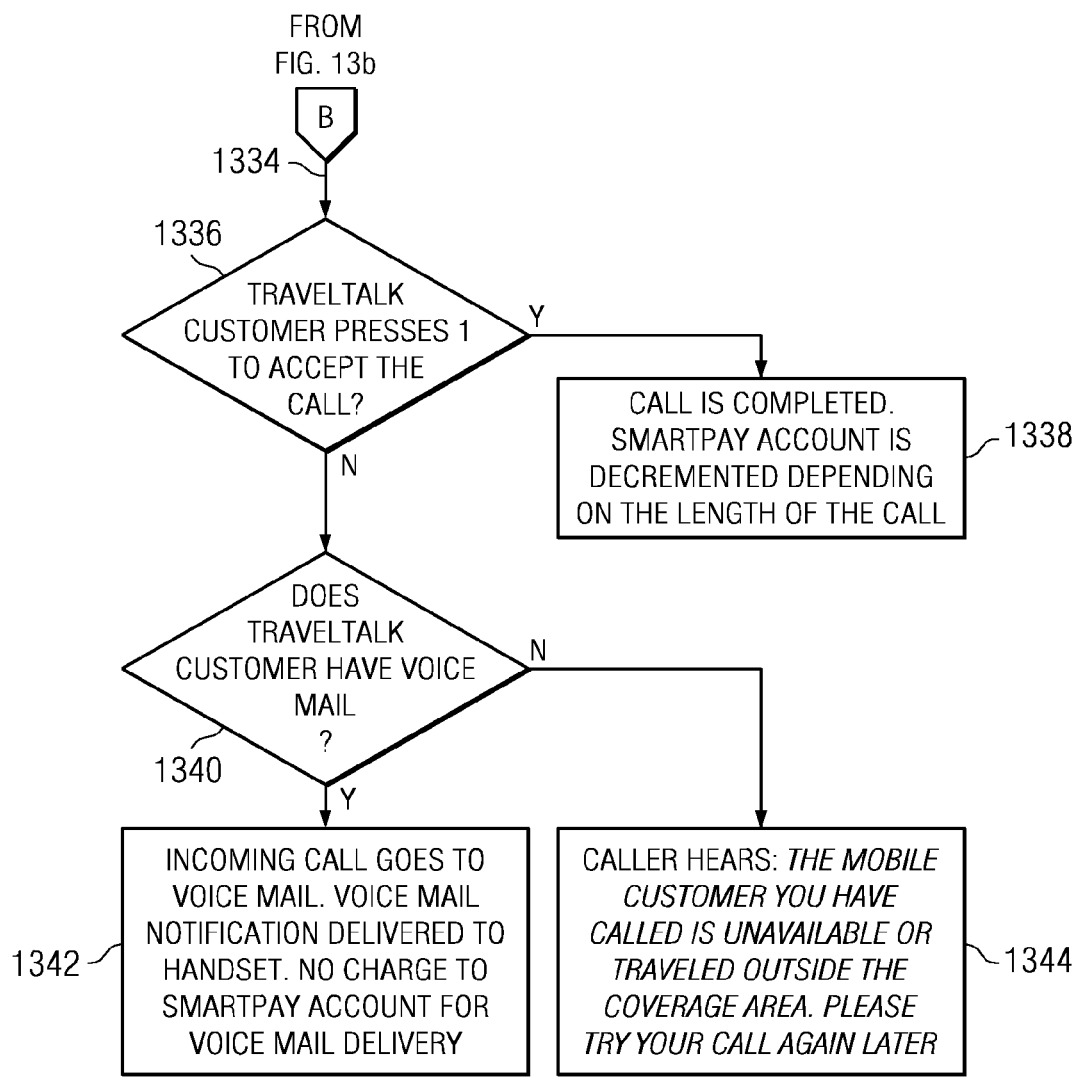

Referring now to FIGS. 13*a*-13*c* there is illustrated a flow chart for the general call operation utilizing what is referred to by the Assignee of the present invention as the "TravelTalk." This program is initiated at a function block 1302 wherein a non-TravelTalk phone places a call to a TravelTalk number. The caller will receive a response "Thank you, your call is in progress." The program then flows to a decision block 1304 to determine if the TravelTalk handset is powered on, i.e., the subscriber recipient. If not, the program flows along an "N" path to a decision block 1306 to determine if the subscriber has voice mail. If he does, the program flows to a function block 1308 to route the incoming call to voicemail. A voicemail notification is then delivered when the handset of the subscriber is powered on. There is no charge to the pre-paid account which is referred to as a "SmartPay" account for this voicemail delivery. However, if no voicemail is provided, the program will flow to a function block 1310 wherein the caller will hear a message to the effect that "The mobile customer you have called is unavailable or traveled outside the coverage area. Please try your call again later."

If the subscriber handset is powered on, the program will flow from decision block 1304 along a "Y" path to a decision block 1312 to determine if the customer using this feature, the TravelTalk feature, is "out of market." If not, the program flows along an "N" path to a function block 1314 to determine if the SmartPay account, i.e., the pre-paid account, has at least a certain amount of money contained therein, i.e., a certain balance. In this embodiment, this is $0.79 plus tax. If not, the program flows along an "N" path to a function block 1316 to indicate to the caller that the customer is unable to receive with the following message: "The customer that you are calling is unable to receive calls at this time. Please try your call again later." However, if the SmartPay account has a sufficient balance, the program will flow from the decision block 1314 to a node 1318, which is handled by the remaining portion of the flow chart in FIG. 13b.

If the customer utilizing the TravelTalk feature is outside of the market area, i.e., out of network, then the program will flow from the decision block 1312 along the "Y" path to a decision block 1320 to determine if the SmartPay balance is at least a certain level, which, in this preferred embodiment, is $0.49 plus tax. If not, the program flows along a "N" path to a function block 1322 where the caller will be presented with the message "The customer that you are calling is unable to receive calls at this time. Please try your call again later." If the account has sufficient funds, the program will flow from the decision block 1320 along the "Y" path to node 1318 and then to the remaining portion of the flow chart in FIG. 13b.

Referring now to FIG. 13b there is illustrated the next portion of the flow chart which flows from the node 1318 to a decision block 1324 to determine if the TravelTalk customer has answered the phone. If not, the program will flow along the "N" path to a decision block 1326 to determine if the customer has voice mail and, if so, to a function block 1328 to route the incoming call to voicemail and then voicemail notification will be sent to the handset with no charge to the SmartPay account. However, if there is no voicemail, the program flows to a function block 1330 which will deliver a message to the caller substantially identical to that in function block 1310, i.e., that the customer is not available and to call back later.

If the TravelTalk customer subscriber having that feature answers the phone, the program flows along a "Y" path from decision block 1324 to a function block 1332 wherein the caller will be presented with the message: "Please continue to hold," and then flow is to a node 1334 which will flow to the remaining portion of the flowchart in FIG. 13c.

In FIG. 13c, the program will flow into a decision block 1336 to determine if the TravelTalk customer has pressed a "1" to accept the call, i.e., an affirmative action. If so, then the program will flow along the "Y" path to a function block 1338 to indicate that the call is completed, and the SmartPay account decremented by the correct amount. If the call has not been accepted, then the program will flow along an "N" path from decision block 1336 to a function block 1340 to determine if the subscriber has voice mail and then to a function block 1342 if they have it, similar to function block 1328, and then to a function block 1344 if the subscriber does not have voice mail, similar to the function block 1330. This above procedure with respect to FIGS. 13a-13c is the general calling experience to the customer.

With reference to FIGS. 14a-14d, the inbound call will be described with respect to the aspect of voice notification. The program is initiated at a decision block 1402 to determine if the phone has the roaming feature activated. This is for an inbound call to a TravelTalk customer. If they do not, the program will flow to a function block 1404 wherein indication is made that the roaming phone will not ring for this incoming call. The roaming feature will have to be added to the account and then, after adding, this will require the user to power cycle their handset. However, if the roaming feature is provided in the phone, the program will flow to a decision block 1406 to determine if the network setting in the handset is set to the appropriate automatic operation. If not, the program will flow to a function block 1408 indicating that the phone will not ring for an incoming call. This will require customer service to change the network setting in their handset. Once on automatic, this will allow the phone to ring and proceed according to the following steps.

Once it is determined that the handset is set on automatic, the program will flow along a "Y" path from the decision block 1406 to a decision block 1410 to determine if the subscriber being called is out of market. If not, the program flows to a decision block 1414 to determine if the SmartPay balance is above a certain level and, if not, it flows to a function block 1416 wherein the roaming phone will not ring for the incoming call and the customer will be advised through either a text message or some other means that they need to make a payment to their handset and then re-cycle their hand set. If there are sufficient funds in the account, this being a local call, the program will flow to a node 1418 which flows to the portion of the flow chart beginning in FIG. 14b.

If the subscriber is determined to be out of market, the program will flow from the decision block 1410 to a decision block 1420 to determine if their SmartPay balance is above a certain level. If not, the program will flow to a function block 1422 in order to advise a customer to make a payment to their SmartPay account and then re-cycle their handset. However, if they do have a sufficient balance, then the program will flow along the "Y" path to the node 1418 and then to FIG. 14b.

Figure 14A:
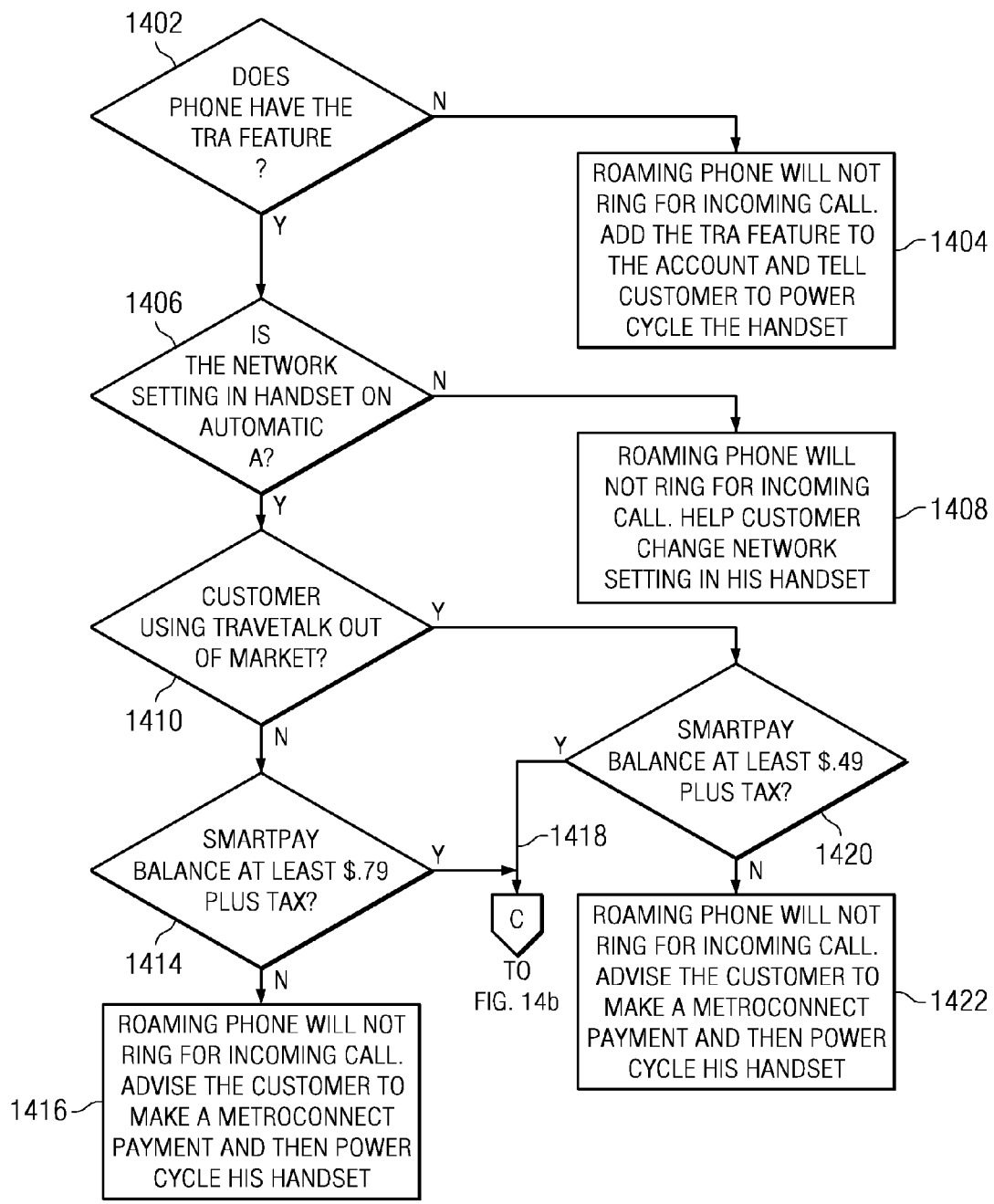
FIGS. 14a-14d illustrate an inbound call to a roaming customer.
Figure 14B:
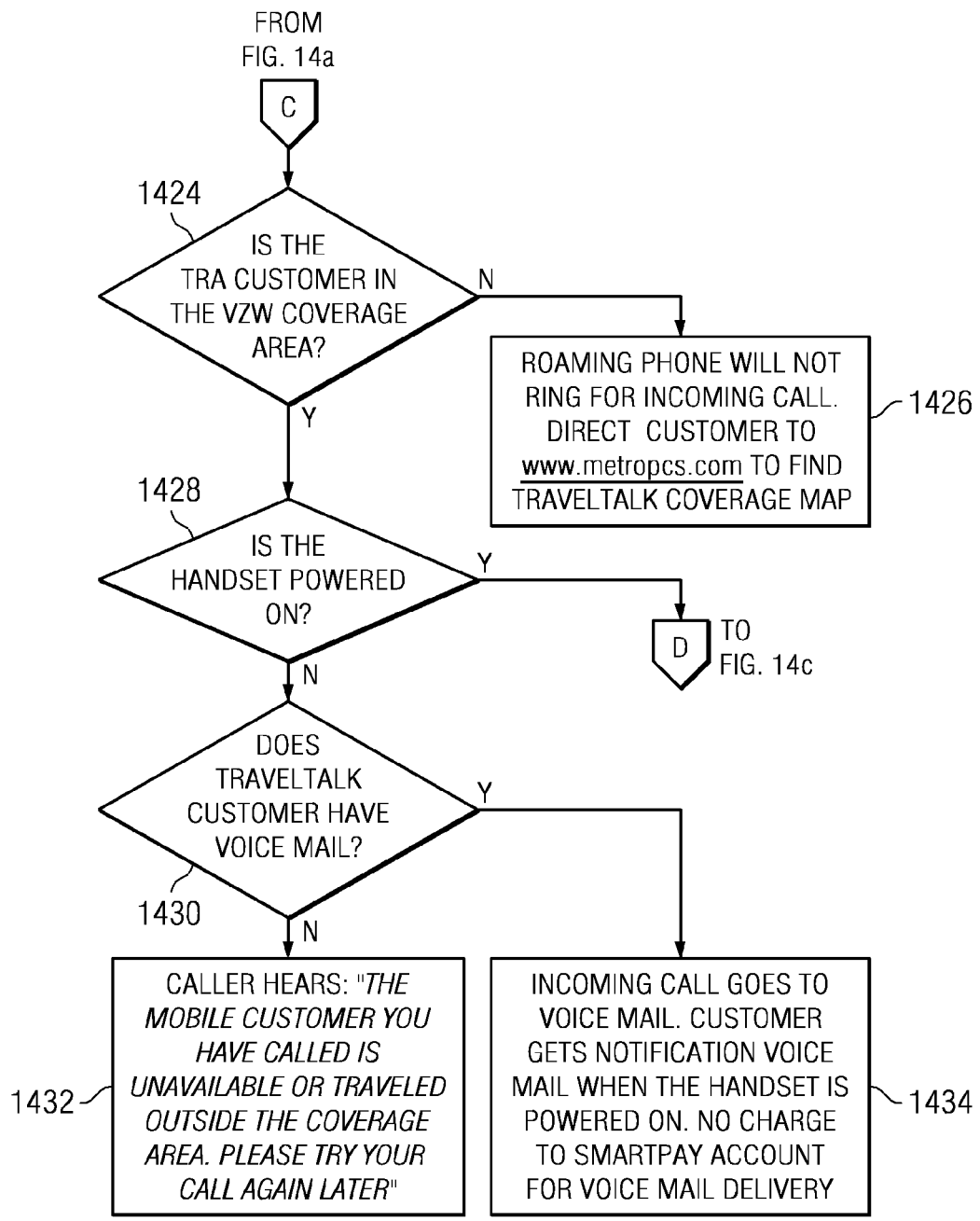

Referring now to FIG. 14b, there is illustrated the next portion of the flow chart, which is initiated at a decision block 1424. This decision block determines whether this subscriber with the authorized service is in the coverage area for one of the preferred roaming platforms. This referred to as the "VZW" platform. Of course, there could be many other platforms and the decision would be made as to whether it was within one of the preferred roaming platforms. If not, the program will flow to a function block 1426 indicating that the roaming phone will not ring for an incoming call. However, the customer will be directed to a particular website to find the particular coverage map for their roaming area, i.e., it will indicate that they are out of the roaming area. This is merely for informative purposes.

If the subscriber is in the roaming platform area, i.e., the VZW area, the program flows along the "Y" path from the decision block 1424 to a decision block 1428 to determine if the handset is powered on. Heretofore, all the determinations are made at the HLR. At this point, there is an attempt to contact the subscriber. If the subscriber has their handset powered off, the program will flow along the "N" path to the decision block 1430 to determine if the subscriber has voicemail and, if not, the program will flow to a function block 1432 in order to provide the caller a message similar to that in function block 1330 and, if there is a voicemail, the program will flow to a function block 1434, similar to function block 1328 with the exception that the voicemail is delivered when the handset is powered on.

Figure 14C:
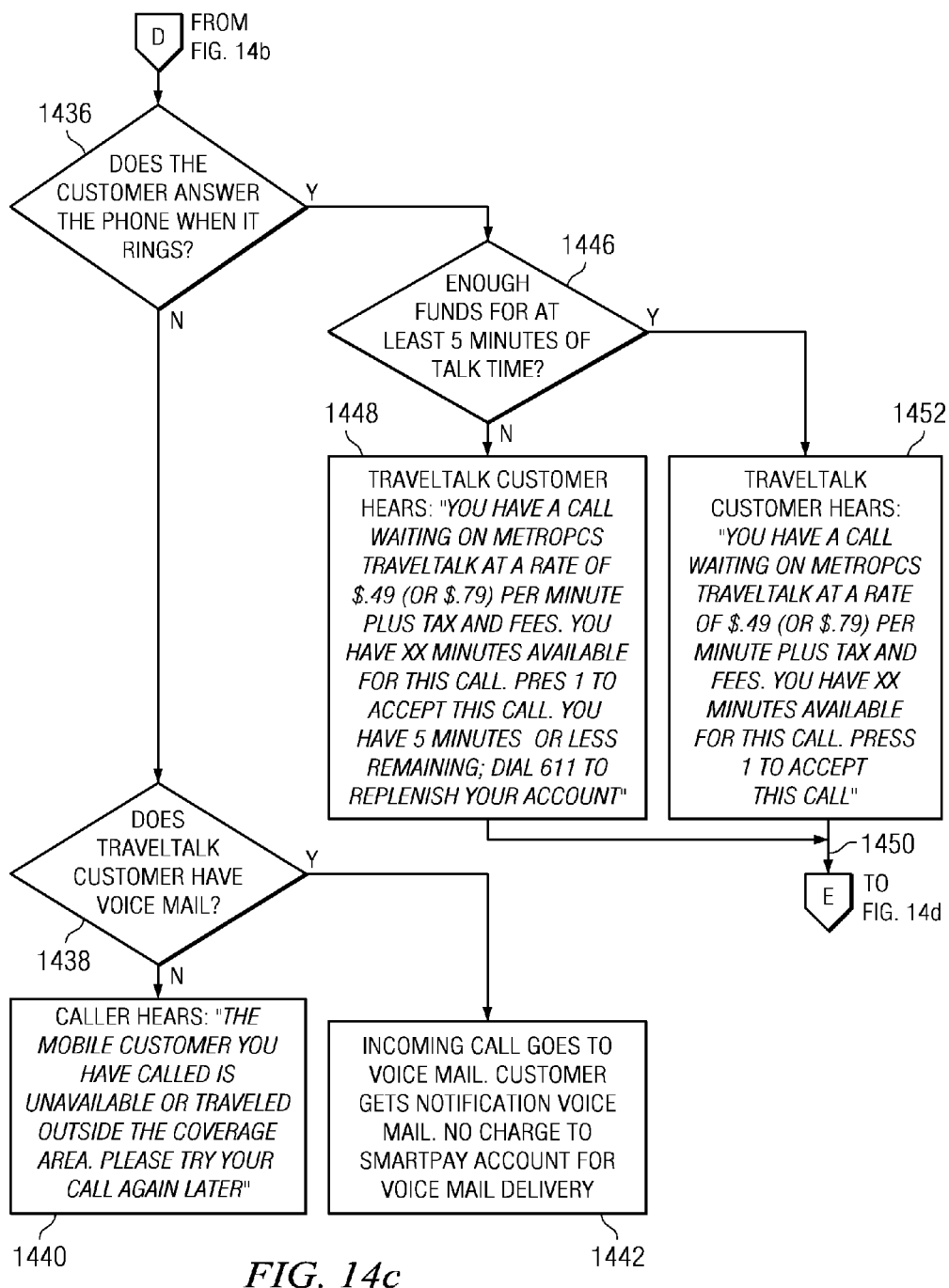

If the handset is powered on, the program will flow from the decision block 1428 along the "Y" path to the remaining portion of the flow chart illustrated in FIG. 14*c*.

Referring now to FIG. 14*c*, there is illustrated the remaining portion of the program initiated at a decision block 1436 to determine if a customer answers the phone when it rings. If not, the program flows to a function block 1438 to determine if the subscriber has voicemail and, if not, the program flows to a function block 1440 similar to function block 1330 and, if the subscriber has voicemail, the program will flow to a function block 1442 to route the call to voicemail and then provide the customer with voicemail notification, all with no charge to the subscriber for voicemail delivery.

When the customer answers the phone, the program flows from the decision block 1436 along the "Y" path to decision block 1446 to determine if there are sufficient funds for at least five minutes of talk time. This amount of five minutes is arbitrary and could be any number of minutes. If not, the program will flow along a "N" path to a function block 1448 wherein the TravelTalk customer will hear (noting that the customer has already answered the phone) "You have a call waiting on Home Carrier TravelTalk at a rate of $0.49 (or $0.79) per minute, plus tax and fees. You have XX minutes available for this call. Press 1 to accept this call. You have 5 minutes or less remaining; dial 611 to replenish your account." The program then flows to a node 1450 which routes the program to remaining part of the flow chart in FIG. 14*d*.

If the subscriber has at least 5 minutes of talk time, the program will flow along the "Y" path from the decision block 1446 to a function block 1450 to provide an announcement to the subscriber as follows: "You have a call waiting on Home Carrier TravelTalk at a rate of $0.49 (or $0.79) per minute, plus tax and fees. You have XX minutes available for this call. Press 1 to accept this call." The program the flows to the node 1450 and then to the flow chart of FIG. 14*d*.

Figure 14D:
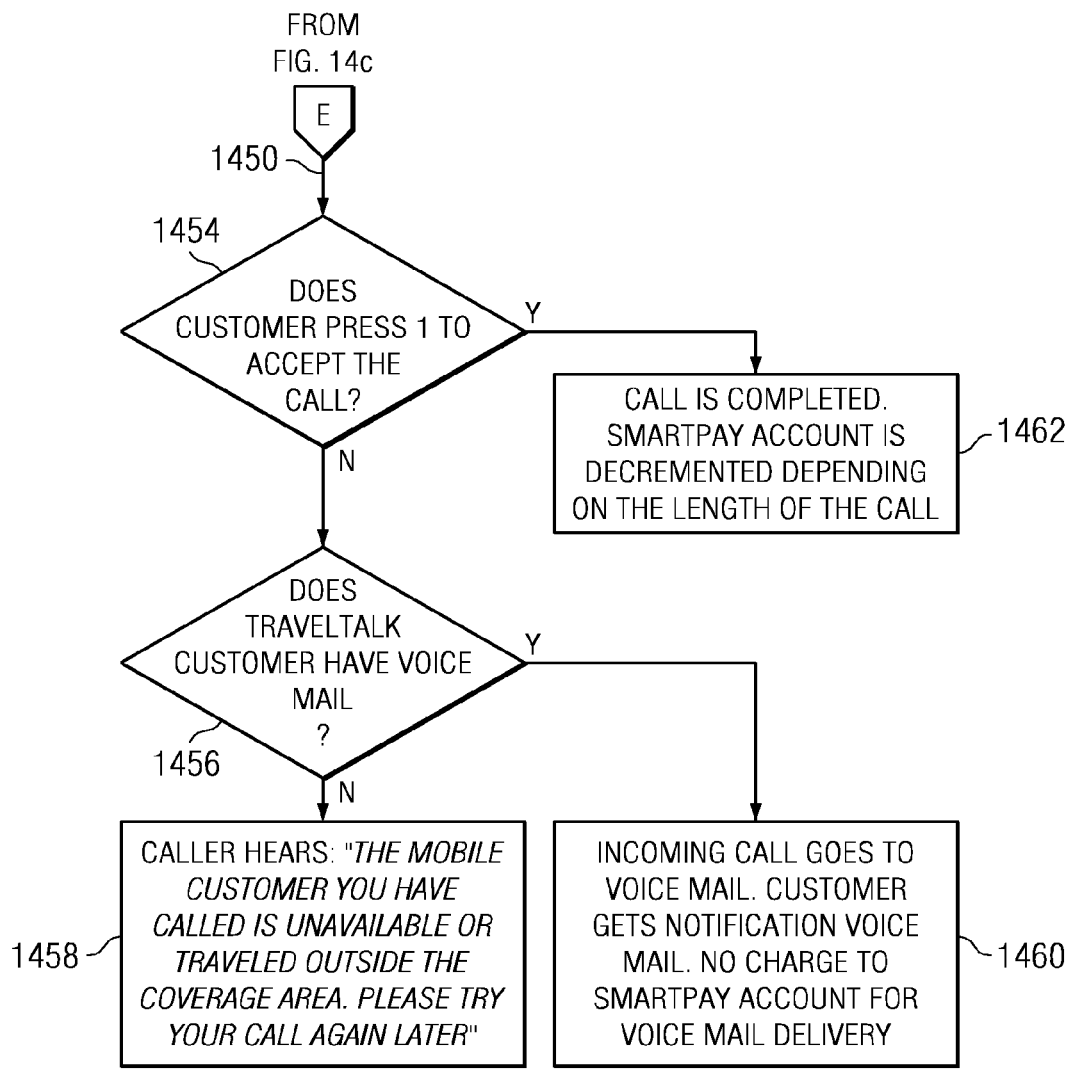

In FIG. 14*d*, the flow proceeds to a decision block 1454 to determine if the customer pressed 1 to accept the call. If not, the program flows to a decision block 1456 to determine is the subscriber has voicemail and, if not, to a function block 1458 similar to function block 1440 and, if yes, to a function block 1460, similar to function block 1442. However, if the customer hasn't pressed 1, the program will flow from the decision block 1454 along the "Y" path to a function block 1462 in order to complete the call and then the SmartPay account is decremented. Prior to this point in time, all of the call billing, since a call must have been built by the roaming platform in order for the customer to be notified of information about the call, i.e., pre-call announcement, and all of this charge will be absorbed by the carrier.

Figure 15:
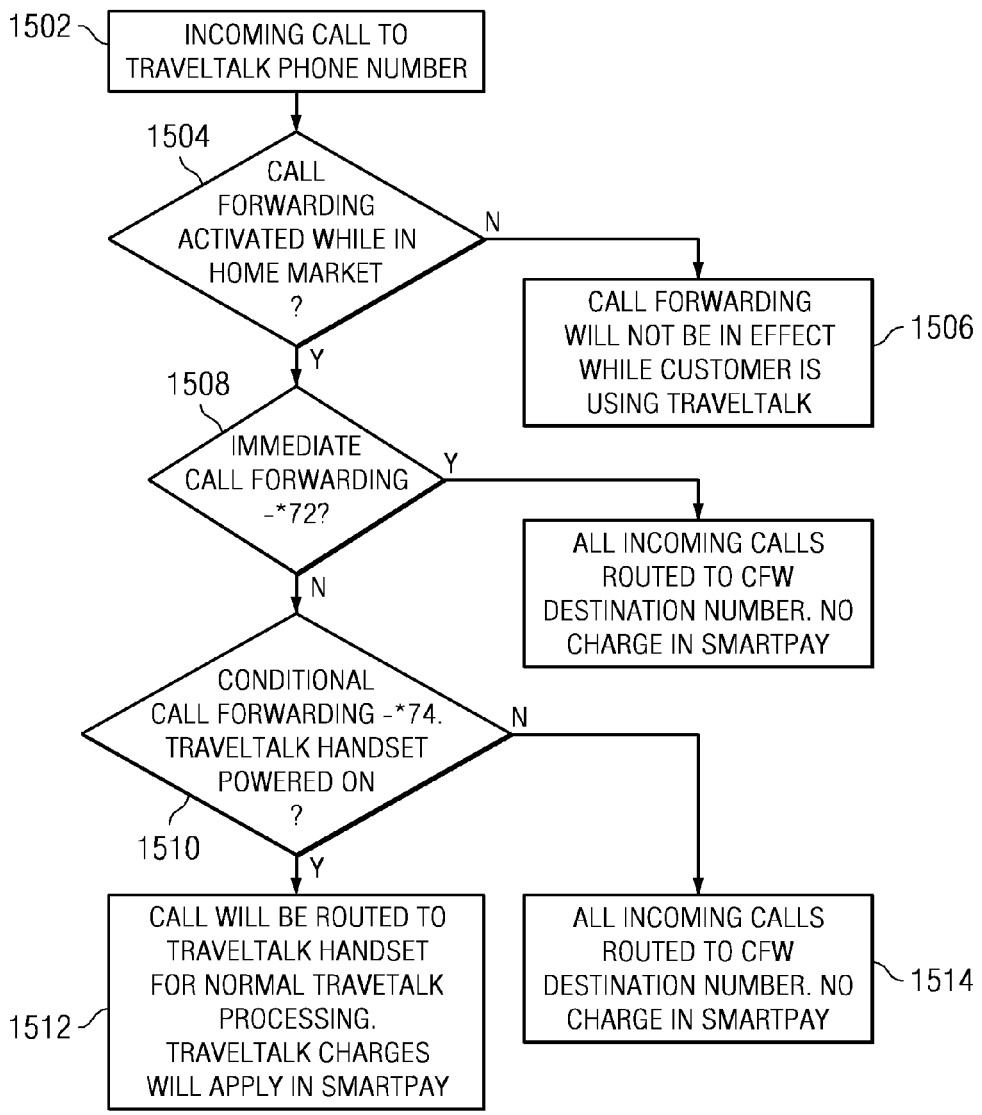
FIG. 15 illustrates an inbound call to a roaming subscriber utilizing call forwarding.

Referring now to FIG. 15, there is illustrated a flow chart for the feature of an inbound call to a subscriber when utilizing call forwarding. This program is initiated at a function block 1502 indicating that an incoming call has been made to a TravelTalk phone number. The program then proceeds to decision block 1504 to determine if call forwarding has been activated while in the home market. If no, the program will flow to the function block 1506 indicating that call forwarding will not be in effect while the customer is using this feature. If call forwarding has been activated, the program will flow along the "Y" path then to a decision block 1508 to determine if immediate call forwarding has been activated, i.e., the "*72" feature. If not, the program flows to decision block 1510 to determine if conditional call forwarding has been activated, i.e., the "*74" feature. Also, there is also a question as to whether the handset is powered on. If conditional call forwarding has been activated and the handset is powered on, the program will flow to a function block 1512 wherein the call will be routed to the TravelTalk handset for normal TravelTalk processing as noted herein above. The TravelTalk charges will be applied to the SmartPay account, as indicated herein above. If the conditional call forwarding has not been set, and the handset is not powered on, the program will flow to a function block 1514 wherein all incoming calls are routed to the call forwarding destination number. Again, there is no charge in the SmartPay account. However, if immediate call forwarding is set, all incoming calls will be routed to the call forwarding destination number with no charges will be made to the SmartPay account. In essence, this particular flow chart provides for the situation wherein conditional call forwarding can be provided in the event that the TravelTalk handset is powered on.

Referring now to FIGS. 16*a*-16*d*, there is illustrated a flow chart depicting the outbound operation. The flow is initiated at a decision block 1602 to determine if the phone has the TravelTalk feature. If not, the customer will hear the message "Welcome to (out of network carrier). Roaming is unavailable from this service area. You can immediately place a call using a credit card . . . " and then the user can add the feature to their account if they desire to do so, after which they would have to power cycle the handset. If they do have the roaming feature, the program will flow to a decision block 1606 to determine if the network setting on the handset for roaming is automatic. If not, the program will flow to a function block 1608 to indicate that the roaming phone will display searching for a service and then the customer will be assisted in changing the network setting in his/her handset. If the network setting is automatic, the program will flow along a "Y" path to a decision block 1610 to determine if the customer is in the VZW coverage area, i.e., the preferred roaming platform coverage area. If not, the program will flow to a block 1612 similar to function block 1426 to be informed of the coverage map for the particular service that they have subscribed to. If they are within the coverage area for a preferred roaming platform, the program will flow along a "Y" path to node 1614 and then to the remaining portion of the flow chart beginning in FIG. 16*b*.

Figure 16A:
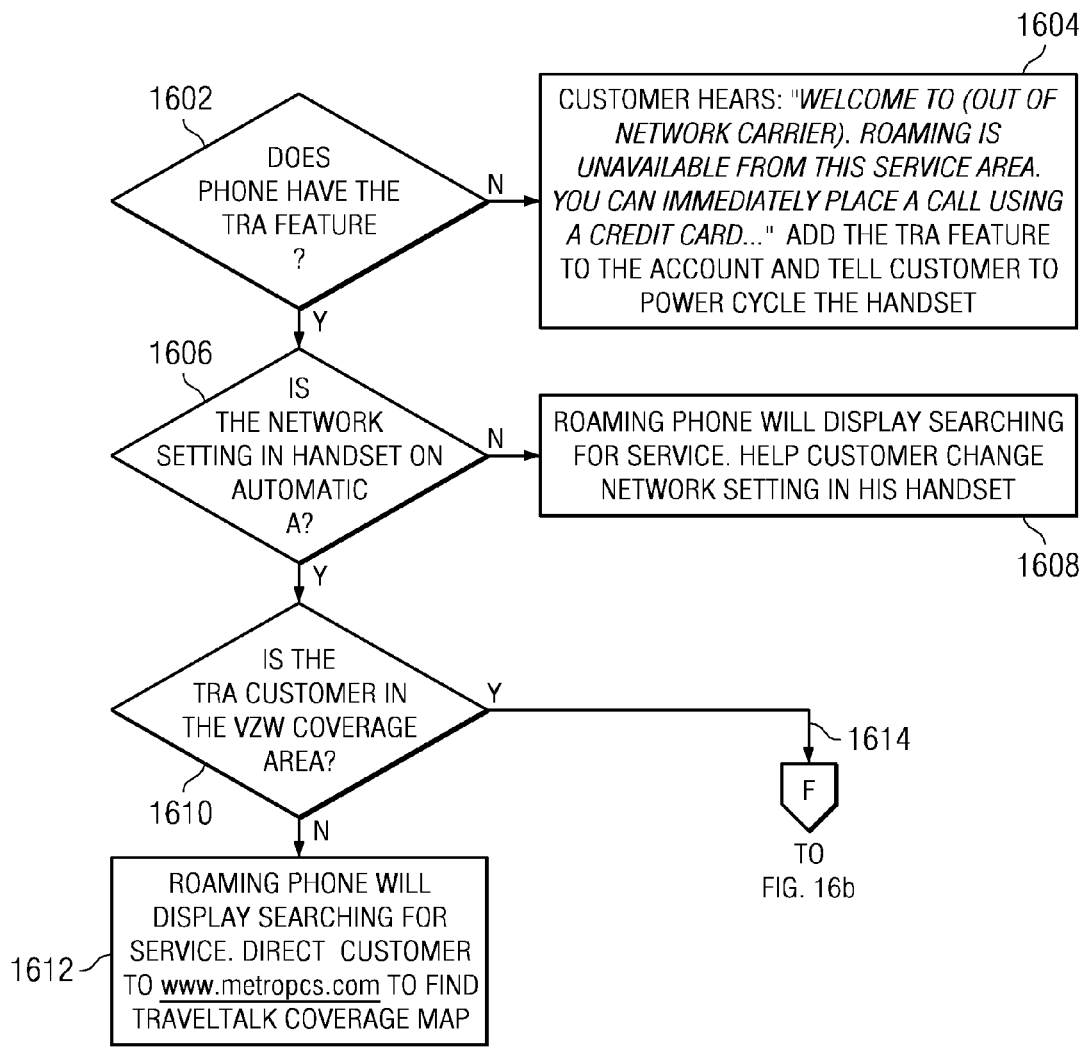
FIGS. 16a-16d illustrate an outbound call made by a roaming subscriber.
Figure 16B:
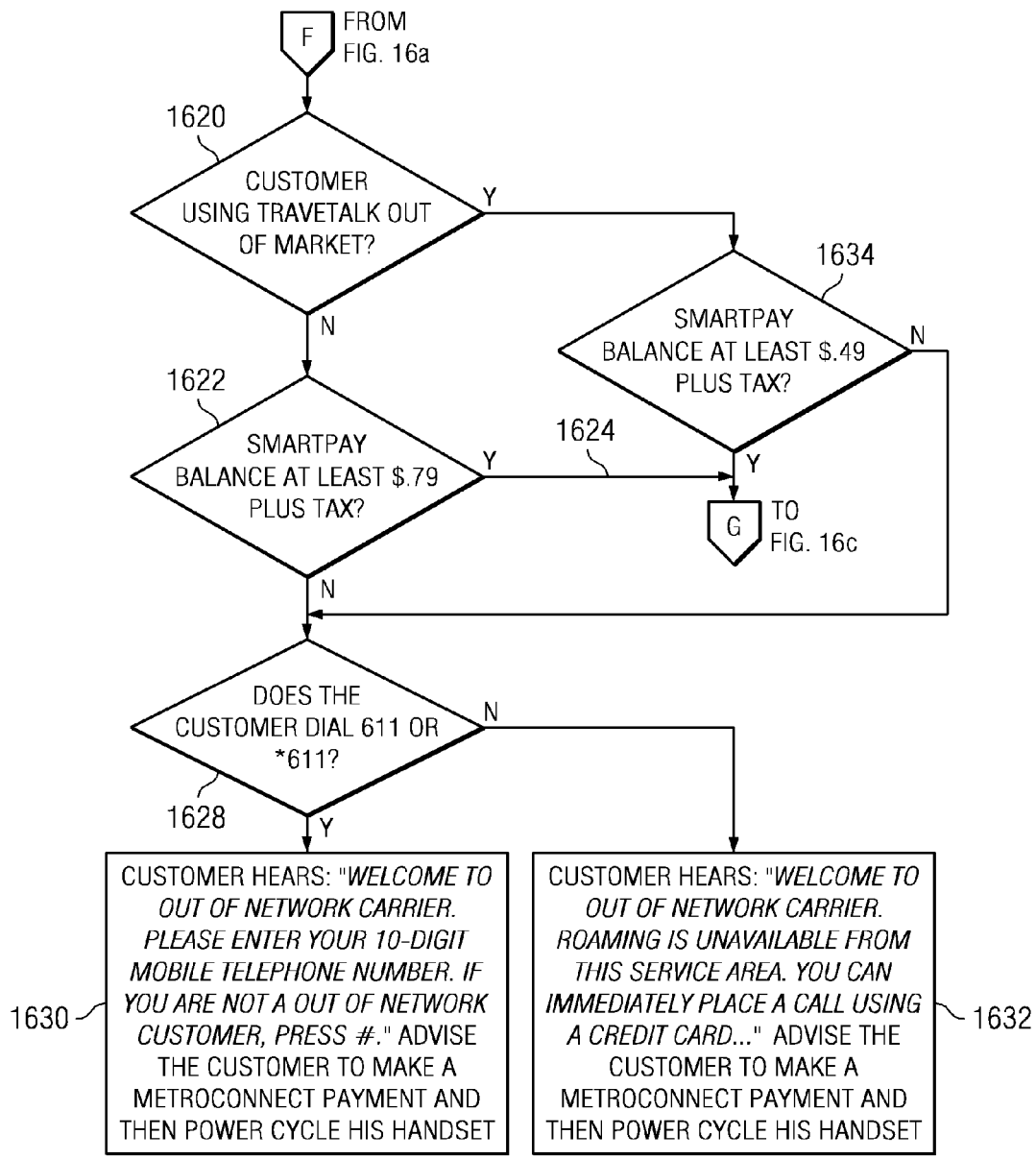

Referring to FIG. 16*b*, the program flows to a decision block 1620 to determine if the subscriber is out of market. If not, the program will flow to a decision block 1622 in order to determine if their smart pay balance is at least a certain level. If so, the program flows to the remaining portion of the flow chart in FIG. 16*c* on a node 1624 and, if not, the program flows to the input of a decision block 1628 to determine if the customer has dialed the digits "611" or "*611." This indicates access to the carrier's administrative services. If the number has been dialed, the program will flow to a function block 1630 wherein the customer will be presented with the message "Welcome to (out of network carrier). Please enter your ten-digit mobile telephone number. If you are not a (out of network customer), press #." The customer will then be advised to make a payment to their SmartPay account and then to power cycle their handset. However, if they have not dialed the correct numbers, the program will fall along the "N" path from the decision block 1628 to a function block 1632 where the customer will be provided a message "Welcome to (out of network carrier). Roaming is unavailable from this service area. You can immediately place a call using a credit card . . . " The customer will then be advised to make a payment to their SmartPay account and then power cycle their handset.

If the customer is out of market, the program will flow along the "Y" path from the decision block 1620 to a decision block 1634 in order to determine if they have sufficient funds in their SmartPay account. If not, the program will be routed to the decision block 1628 and the call will be terminated after dialing the numbers associated with decision block 1628. However, if there are sufficient funds, the program flows along the "Y" path to the remaining portion of the function block in FIG. 16c at node 1624.

Figure 16C:
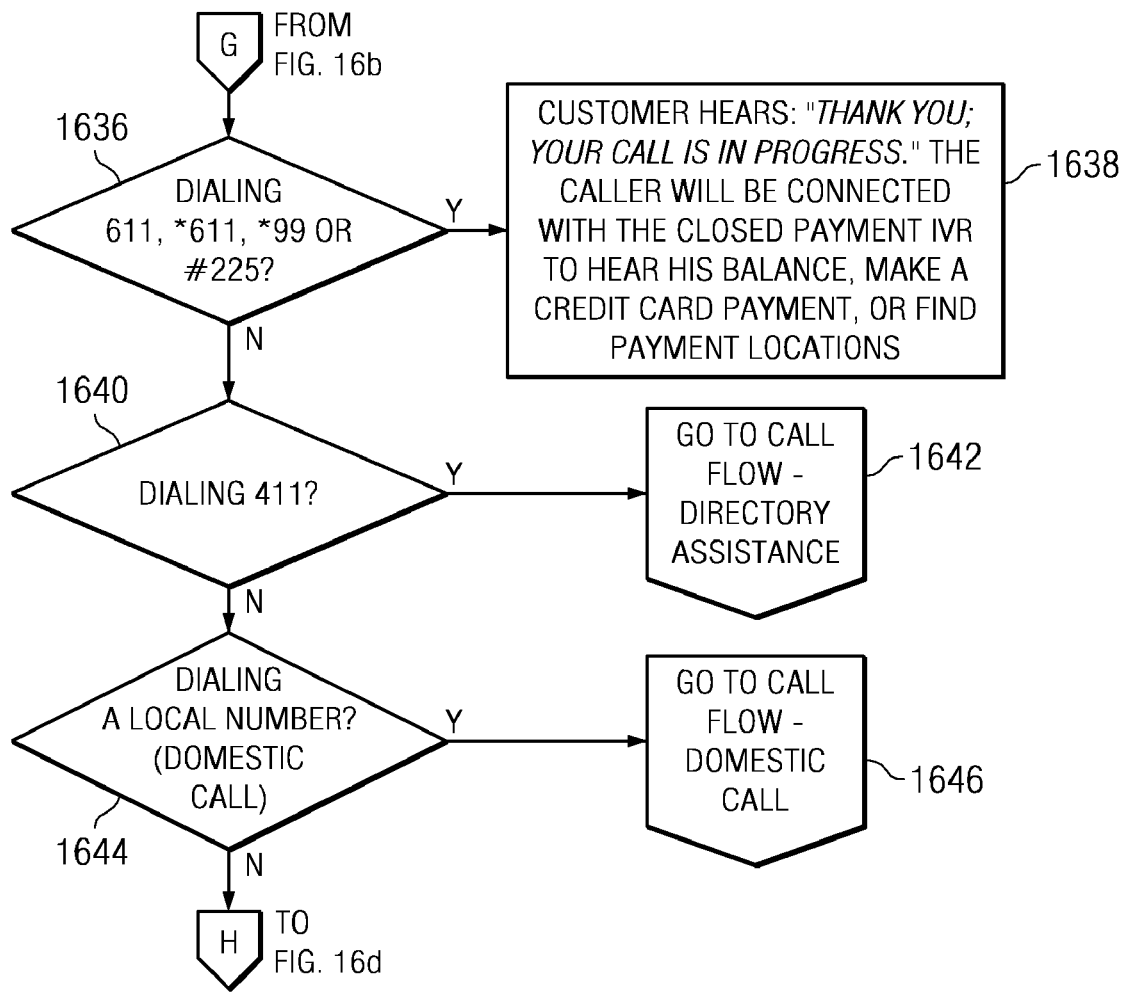
Figure 16D:
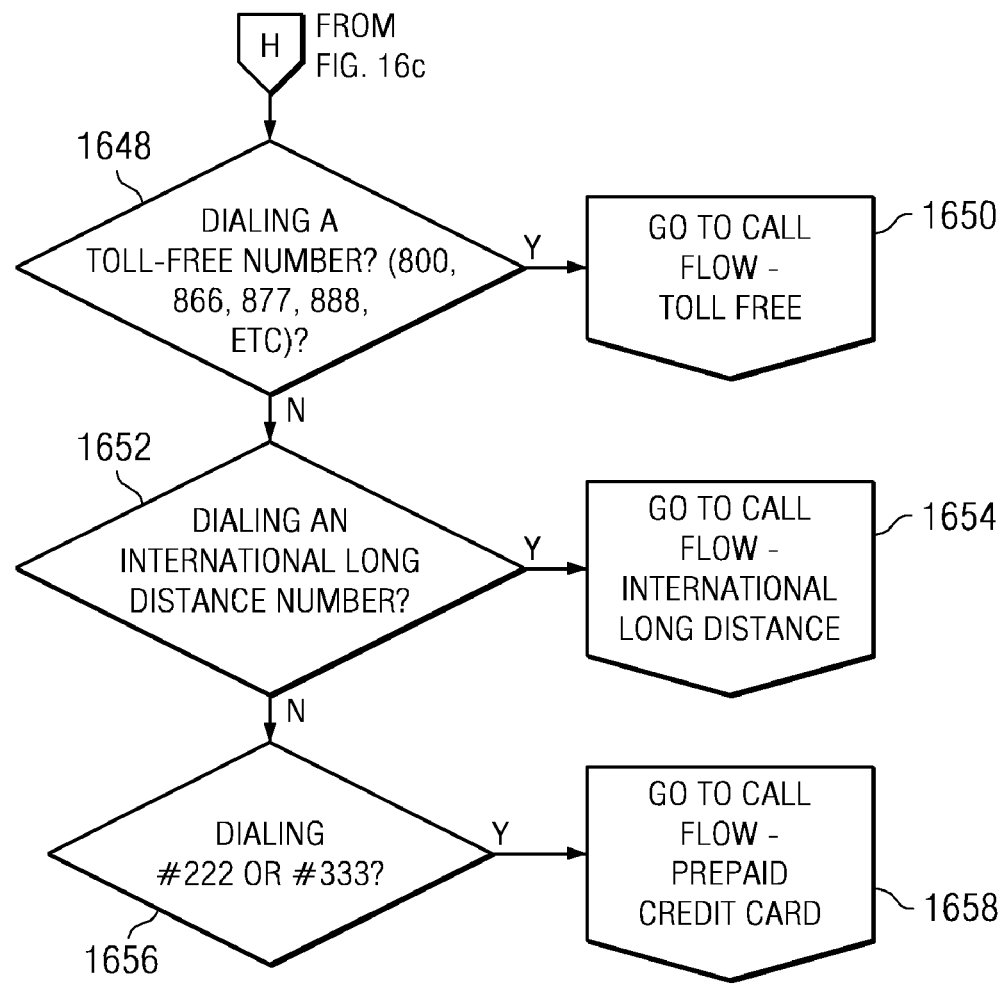

In FIG. 16c, the flow begins at a decision block 1636 to determine if the user has dialed the key strings "611," "*611," "*99," or "*#225." If so, the program flows to function block 1638 wherein the customer is provided with a message "Thank you; your call is in progress." The call will then be connected with the closed payment accounting system to hear the balance, make a credit card balance, or find payment locations. This generally allows users to update their account. However, if those were not the strings dialed, the program will flow to a decision block 1640 to determine if the user dialed "411," the directory assistance number. If yes, the program will flow to a function block 1642 in order to route the call to directory assistance. If "411" were not dialed, the program will flow to the decision block 1644 to determine if a domestic call is being made. If yes, the program will flow to function block 1646 to go to the domestic call flow chart described herein below. If a domestic call is not made, the program will flow to the flow chart of FIG. 16d, which begins at a decision block 1648 to determine if a toll free number has been dialed. If so, the program flows to the flow chart 1650 described herein below. If not, the program determines at decision block 1652 if the subscriber is dialing an international long distance number. If so, it flows to a flow chart 1654 described herein below. If a long distance call has not been selected, the program flows to a decision block 1656 to determine if the user is dialing the strings "#222" or "#333." If yes, the program flows to a flow chart 1658 for a pre-paid Credit Card transaction, described herein below. Of course, this could be any type of credit card.

Figure 17:
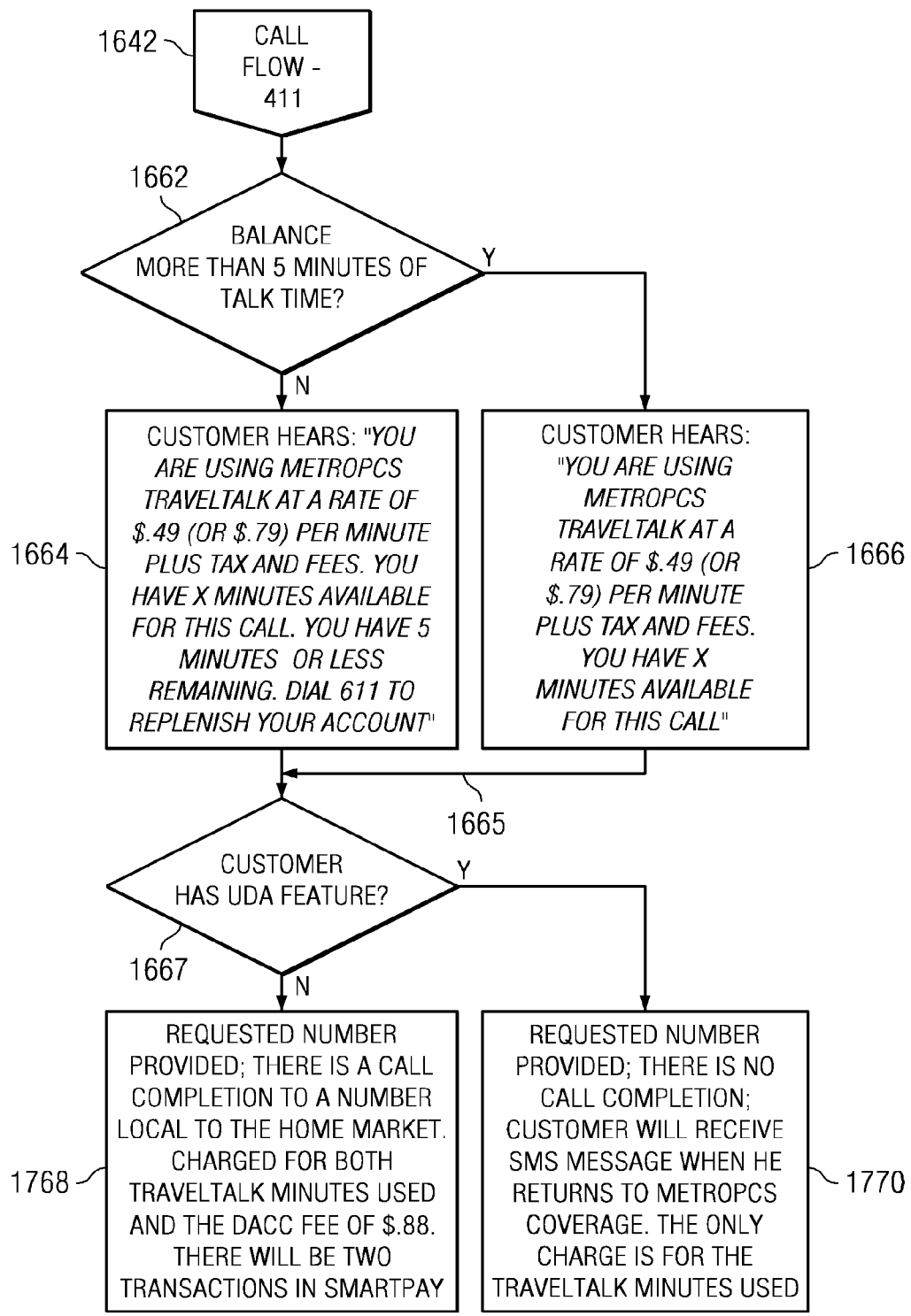
FIG. 17 illustrates call flow for a "411" call.

Referring now to FIG. 17, there is illustrated one of the various outbound call scenarios, this being one associated with the "411" flow chart 1642. At a decision block 1662, a decision is made as to whether the balance is sufficient for 5 minutes or more of talk time. If not, the program flows along a "N" path to a function block 1664 to indicate to the user that they have a certain amount of minutes left available for the call but that they have 5 minutes or less remaining and that they must call "611" to replenish the account. The program then flows to the input of the decision block 1667. If the customer has more than 5 minutes of talk time, the program will flow to a function block 1666 and present the pre-call announcement "You are using Home Carrier TravelTalk at a rate of $0.49 (or $0.79) per minute plus tax and fees. You have XX minutes available for this call." The program then flows to the input of decision block 1667. At decision block 1667, the program determines whether the customer has the UDA (Unbundled Directory Assistance) feature to allow this call to be completed. If not, then the program flows along the "N" path to function block 1768 where a call completion is made to a number local in the home market. The user is charged for both TravelTalk minutes used and the DACC (Direct Access to Content) fee of, for example $0.88 in one embodiment. There will be two transactions in the SmartPay account. If a customer does have the UDA feature, the program will flow along a "Y" path to a function block 1770 wherein the requested number will be provided and there will be no call completion. The customer will receive an SMS (Short Message Service) message when they return to their coverage area. The only charge is for the TravelTalk minutes used, as the user made the decision to go forward.

Figure 18:
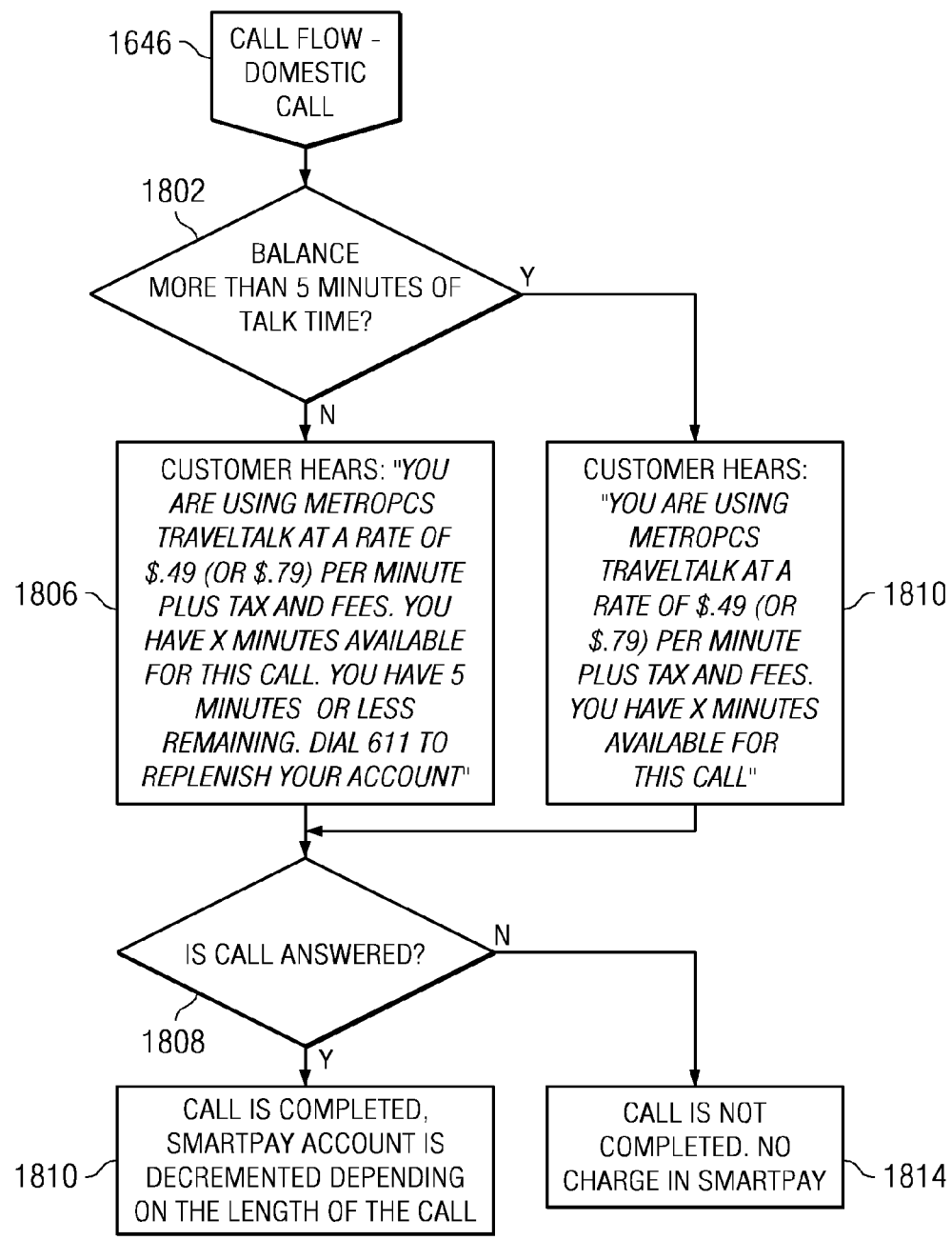
FIG. 18 illustrates a call flow for a domestic call by a subscriber.

Referring now to FIG. 18, there is illustrated a flow chart 1846 for the domestic call. The program flows to a decision block 1802 similar to decision block 1662 to determine if there are more than 5 minutes of talk time. If not, the program flows to function block 1806 for a message identical to the message in function block 1664 indicating that there are 5 minutes or less remaining of time. The program then flows to the input of the decision block 1808. If there are more than 5 minutes of additional time, the program flows to a function block 1810 similar to function block 1666. It should be noted that the user is provided the option of terminating the call at this point in time. If they terminate it, there will be no billing to the customer. This is very similar to the portion of the flow chart of decision block 1454. However, all the user needs to do at this point is to terminate the call and there will be no charge. If the call is answered by the domestic recipient, the program flows to a function block 1810 and the SmartPay account is decremented depending on the length of the call. Of course, this will also result in the carrier being billed for the time of the ring and not for the point at which the announcement ends. This is also similar to the case with respect to if the call is not answered, wherein the program will flow from the decision block 1808 to a function block 1814.

Figure 19:
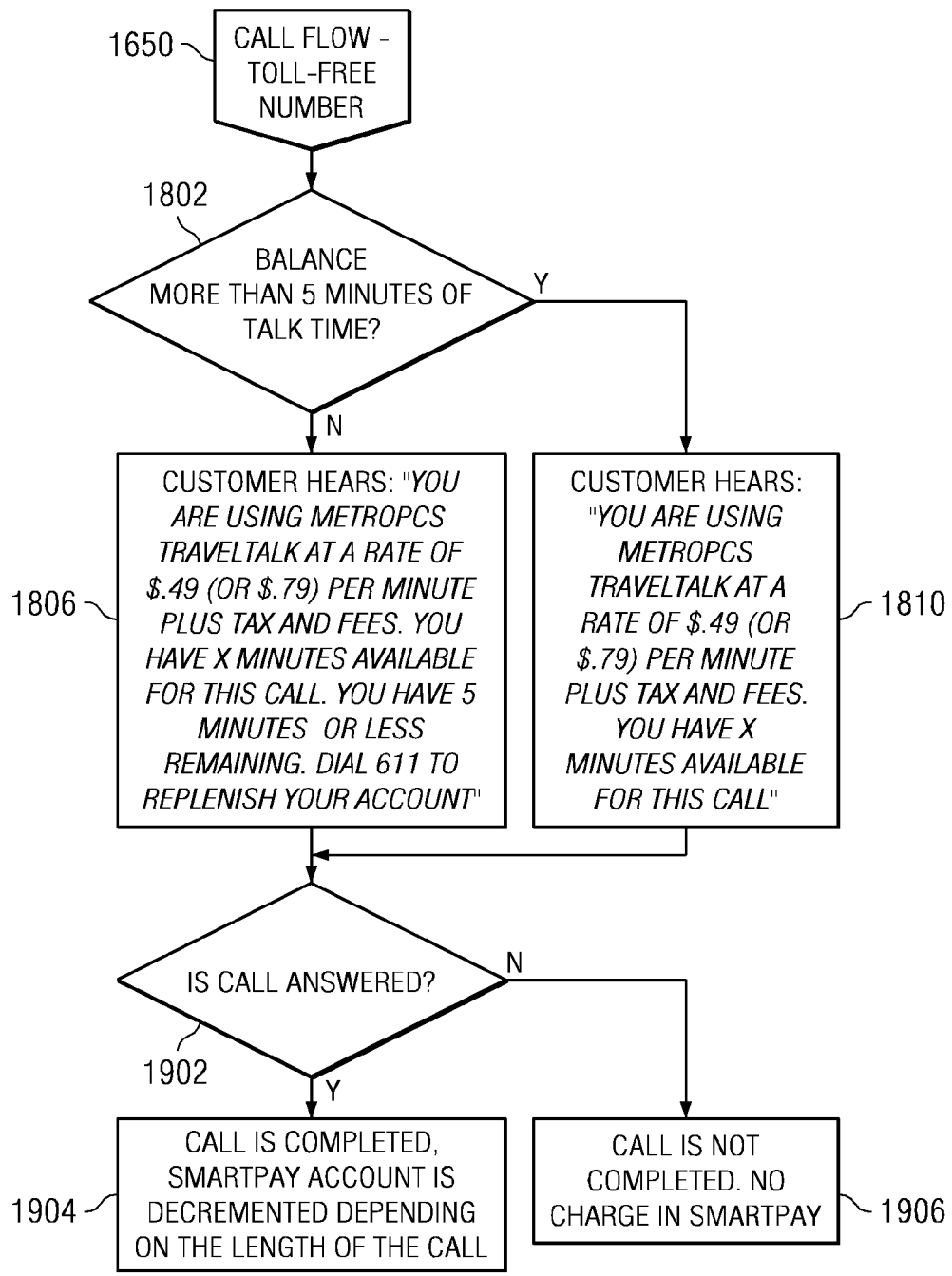
FIG. 19 illustrates a flow chart for the call flow of a toll free number by a subscriber.

Referring now to FIG. 19, there is illustrated the flow chart 1650 for the toll free number. This process flows through the same decision blocks 1802 and associated function blocks 1810 and 1806 to a decision block 1902 to determine if a call is answered. If so, the call is completed, as indicated by function block 1904 and the SmartPay account decremented and if not, it flows to the function block 1906. This is substantially identical to the flow chart of FIG. 18.

Figure 20:
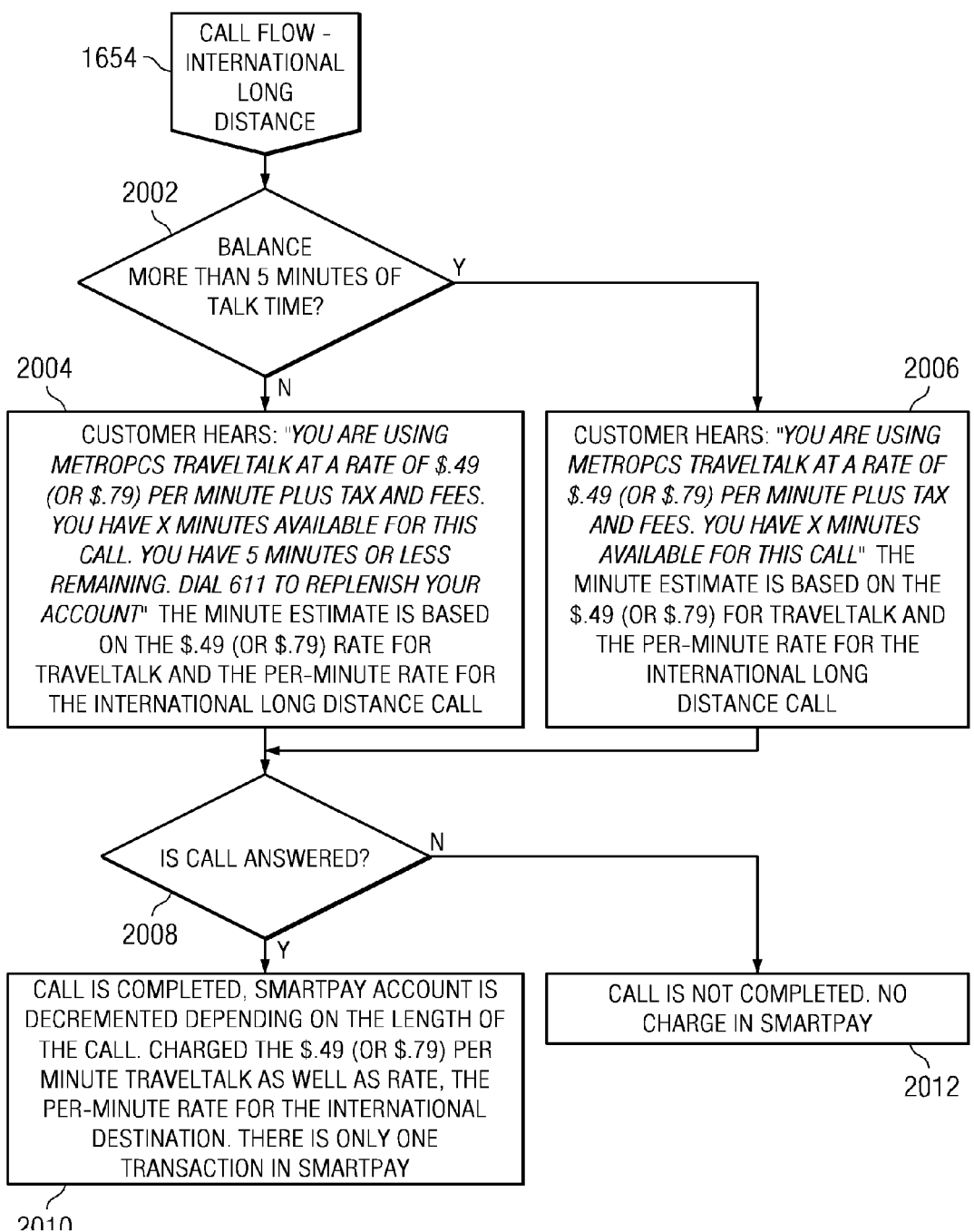
FIG. 20 illustrates a flow chart for the call flow of an international long distance call for a subscriber.

Referring now to FIG. 20, there is illustrated the flow chart 1654. The program flows to a decision block 2002 in order to determine whether there are more than 5 minutes of talk time, if not, the program flows to function block 2004 wherein substantially the same message as that in function block 1806 is provided with the addition that the minute estimate is based on the rate for TravelTalk and the per minute rate for the international long distance call. Thus, both roaming charges and long distance charges are provided. If there are more than 5 minutes of talk time, the program flows to a function block 2006 to provide an announcement similar to that in function block 1810 with the addition that the minute estimate is based on the combination of the roaming and the long distance call rates. The program then flows to decision block 2008 to determine if the call is answered. If so, the program flows to function block 2010 to complete the call and then the SmartPay account is decremented depending on the length of the call. This is for the roaming call rate and the international call rate. There is only a single transaction. If the call is not answered, then billing is not transferred to the subscriber and the program flows to function block 2012 in order to terminate the call and make no charge to the SmartPay account.

Figure 21:
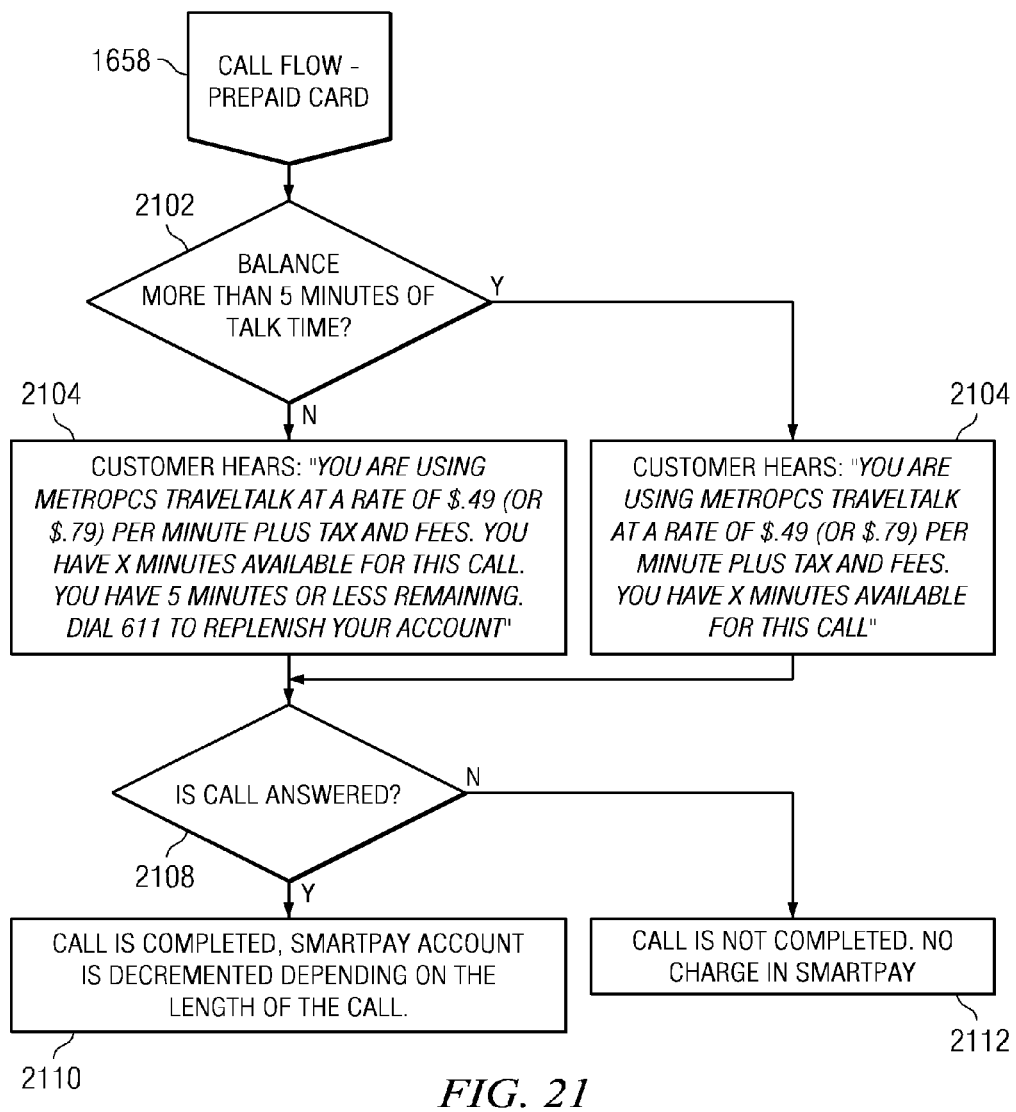
FIG. 21 illustrates a flow chart for the call flow associated with a pre-paid credit card.

Referring now to FIG. 21, there is illustrated the flow chart 1658 for the prepaid card transaction. The program flows to a decision block 2102 in order to determine if more than 5 minutes of talk time is present. If not, the program flows to a function block 2104 similar to function block 1806 indicating how many minutes they have for the call and that they have less than 5 minutes remaining. If more than 5 minutes of talk time are available, the program flows to a function block 2104 to indicate to the user the rate of the call and that they have X minutes for this call,—that is the balance they have in their account. The program then flows to a decision block 2108 to determine if the call is answered. If so, the program completes the call, as indicated by function block 2110 and decrements the SmartPay account for the length of the call. If not, the program flows to a function block 2112 to terminate the call, i.e., it is not completed, and to not charge the SmartPay account.

Figure 22:
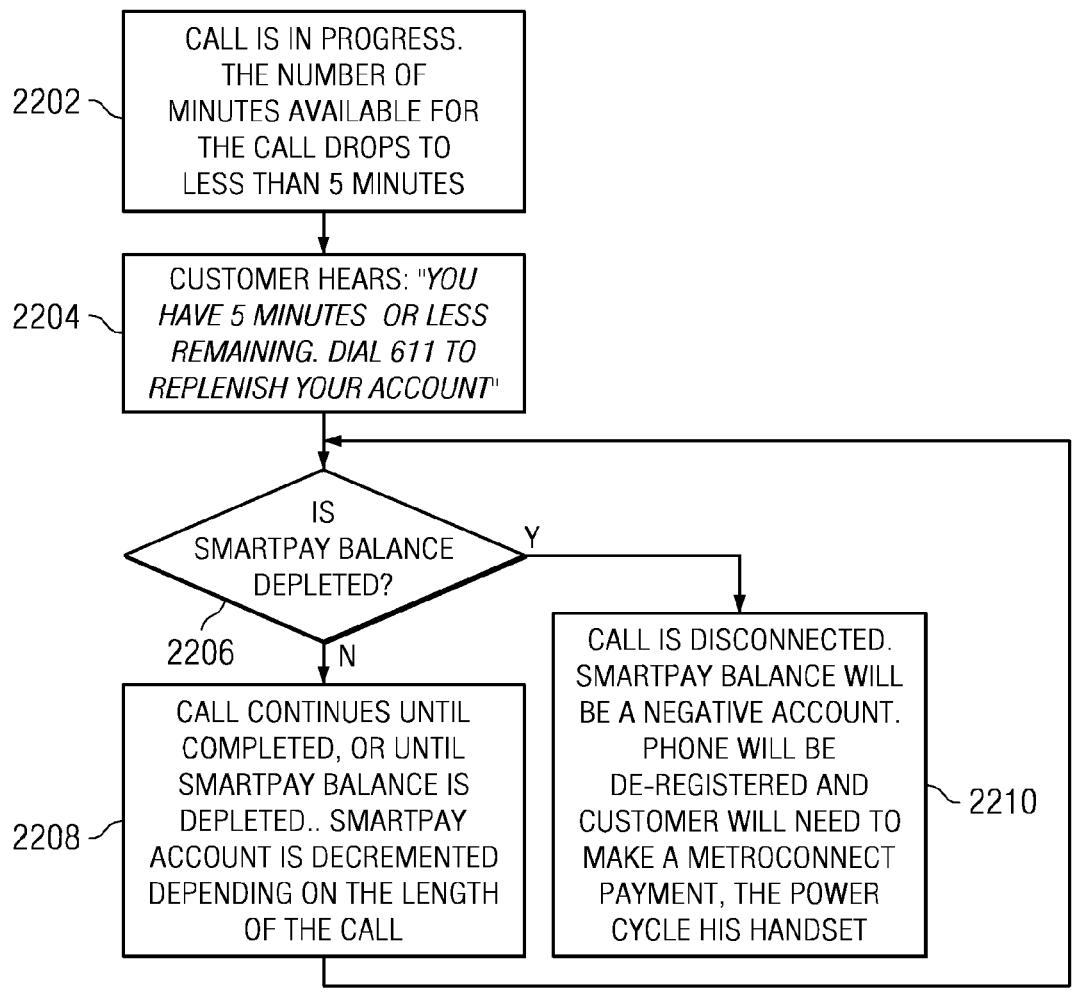
FIG. 22 illustrates a flow chart for replenishing the account of a subscriber.

Referring now to FIG. 22, there is illustrated a program indicating a 5 minute warning. This is initiated at a function block 2202 where the call is in progress and the number of minutes available for the call drops to less than 5 minutes. When this occurs, the program flows to function block 2204 to indicate to the customer the "whisper" that "You have 5 minutes or less remaining. Dial 611 to replenish your account." The program then flows to the decision block 2206 to determine if the smart pay account is depleted. If not, the program will flow in a loop through a function block 2208 to continue the call until completed or until the smart pay balance is depleted, at which time the call is torn down, then the program flows along the "Y" path to a function block 2210 when the call is disconnected. At this point in time, the phone will be de-registered, and the customer will need to make a payment to their account and then, in one embodiment, power cycle their handset. In another embodiment, the power cycle is not required.

Figure 23:
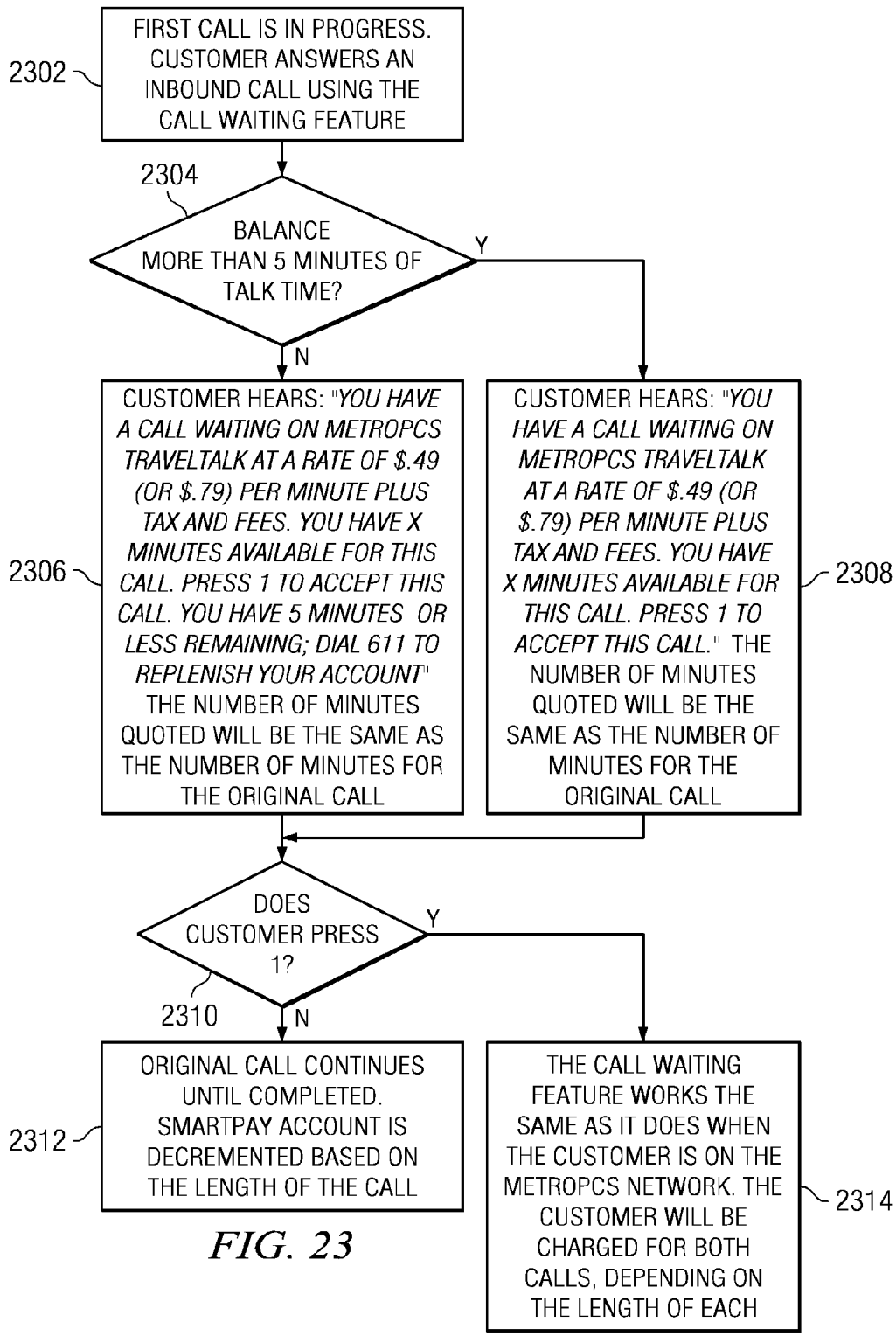
FIG. 23 illustrates a flow chart for inbound call waiting features.

Referring now to FIG. 23, there is illustrated a flow chart depicting the call waiting feature. This is initiated at a block 2302 wherein the first call is in progress and the customer answers an inbound call using the call waiting feature. The program flows to a function block 2304 to determine if there are more than 5 minutes of talk time. If not, the program flows to a function block 2306 to provide the user a message similar to that of function block 1806. The number of minutes quoted will be the same as the number of minutes for the original call in this instance. If there are more than 5 minutes, the program flows to function block 2308 wherein a similar message will be provided to that in function block 1810 indicating the number of minutes available for this call. This number of minutes quoted to the user is the number of minutes for the original call also. This reflects the total talk time. The program then flows to a decision block 2310 to determine if the customer has pressed "1." If not, the program flows to a function block 2312 and the original call continues until completed. The SmartPay account is decremented based on the length of the call. If the customer does press "1" to accept the call, which is part of the message in function block 2308 where it states to the user that "You have X minutes available for this call. Press 1 to accept this call." This is due to the fact that this is a valid call and must affirmatively be accepted. If they do accept it, the call waiting feature is executed as indicated by function block 2314 which operates exactly the same as the one wherein the customer is on at the home network. The customer will be charged for both calls depending on the length of each call, as there are two call connections made through the roaming platform.

Figure 24:
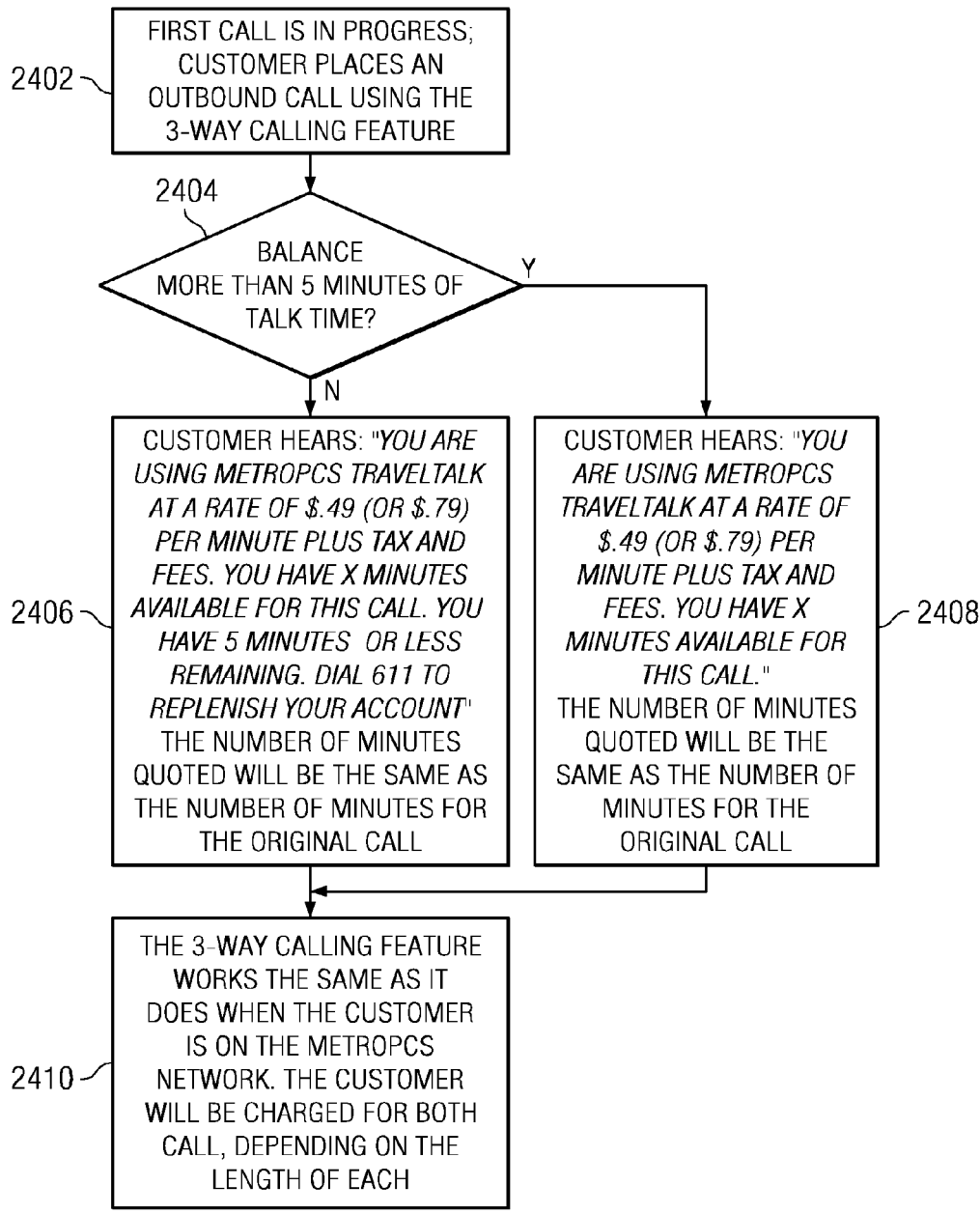
FIG. 24 illustrates a flow chart for placing an outbound call utilizing three-way calling.

Referring now to FIG. 24, there is illustrated a flow chart depicting three way calling. This is initiated at a block 2402 wherein the first call is in progress and the customer then places an outbound call using the three way feature. Similar to the above flow charts, the program flows to a decision block 2404 to determine if there are more than 5 minutes of talk time. If not, the program flows to function block 2406 to provide a whisper message to the user that they have a certain amount of time at a certain rate left. The number of minutes quoted will be the same as the number of minutes for the original call. If they have more than 5 minutes, the program flows along the "Y" path to function block 2408 to provide the whisper message that they are using the TravelTalk feature at a certain rate plus tax and fees and that they have X minutes available. The number of minutes quoted will be the same as the number of minutes for the original call. The program then flows to a function block 2410 indicating that the three way feature works the same as it does when the customer is on the home network. The customer will be charged for both calls depending on the length of each call.

The way that the message is sent to the user during a call is to provide the whisper message which is basically a message that is directed toward the user's earpiece. Typically, most POTS (Plain Old Telephone Service) phones utilize some type of transformer that will allow both sides to hear the conversation such that the user can hear their voice and also hear the other party's voice. In this instance, no "bleed over" of the whisper will be provided to the other side if the whisper is provided during a call. Typically, for these pre-call announcements, there is no connection to the other side.

It will be appreciated by those skilled in the art having the benefit of this disclosure that this invention provides a method for completing a roaming call with a subscriber to a pre-paid cellular telephone service wherein the initial call set up is not billed to the subscriber. As a part of this initial call set up, the subscriber is informed of the potential costs for the call and an account balance in a prep-paid account for that subscriber. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method for completing a roaming cellular call between a roaming subscriber and another party, comprising the steps of:
   initiating the roaming call between the roaming subscriber and the another party, the roaming subscriber having a prepaid debit account;
   connecting the roaming subscriber to a cellular network when a connection between the subscriber and the another party is to be made such that a call has been built over a calling network, wherein the roaming subscriber is within a calling area of a non-home network cellular provider, such that roaming charges apply;
   billing a home network cellular provider of the roaming subscriber for connect charges beginning when the call is built;
   charging the roaming subscriber only a portion of the connect charges beginning when the roaming subscriber is connected to the another party;
   examining the prepaid debit account of the roaming subscriber to determine the balance thereof; and
   transmitting a message to the roaming subscriber to inform the roaming subscriber of at least the balance of the prepaid debit account relating to the call connection prior to connecting the roaming subscriber to another party over the already built call.

2. The method of claim 1, wherein the roaming subscriber is the call originator of the call.

3. The method of claim 1 wherein the roaming subscriber is the recipient of the call from the another party.

4. The method of claim 1 further comprising the step receiving an affirmative response indicating that the call is to be connected from the roaming subscriber prior to allowing the roaming subscriber and the another party to be connected over the calling network.

5. The method of claim 1 further comprising the step allowing the roaming subscriber and the another party to be connected over the calling network after a predetermined time delay after the step of informing.

6. The method of claim 1, wherein the step of transmitting comprises informing the roaming subscriber of at least the cost per unit time of the roaming call.

7. The method of claim 1, wherein the step of initiating the roaming call comprises the steps of:
  selecting a preferred roaming platform from a stored list of authorized roaming platforms arranged in a priority order as to preference in a calling device of the roaming subscriber;
  searching available cellular providers to determine if one or more of the stored authorized roaming platforms is available;
  if one of the cellular providers has associated therewith one of the authorized roaming platforms, selecting the one with the highest priority one thereof and initiating a call connection therewith; and
  the selected cellular provider operable to interface with the designated roaming platform to determine if the roaming subscriber is a valid subscriber and, if so, accepting the call and facilitating the call build.

8. In a cellular network including a first carrier having a first geographical coverage area and a second carrier having a second geographic coverage area, a method of completing a roaming call placed by a subscriber of the first carrier while in the second geographic coverage area, comprising:
  receiving notification of a call placed by the subscriber within the second carrier's geographical coverage area from the second carrier, the subscriber having a prepaid debit account;
  identifying the subscriber as a valid subscriber of the first carrier;
  building the call;
  determining a billing rate for the call;
  determining the balance of the subscriber's prepaid debit account;
  transmitting a message to the subscriber, the message informing the subscriber of the billing rate for the call and the balance in the subscriber's prepaid debit account prior to connecting the subscriber over the already built call;
  providing the subscriber with the option of connecting or not connecting the call after the step of transmitting a message to the subscriber;
  connecting the call after one of receiving an affirmative response from the subscriber or after a predetermined delay after the step of transmitting a message to the subscriber;
  billing the first carrier of the subscriber for connect charges beginning when the call is built when the subscriber is within the geographical coverage area of the second carrier; and
  charging the subscriber only a portion of the connect charges beginning when the roaming subscriber is connected to the another party.

9. The method of claim 8 wherein the step of transmitting a message to the subscriber further comprises transmitting the minutes available for the call based on the balance of the prepaid debit account.

10. The method of claim 8 further comprising the step of terminating the call when the balance of the prepaid debit account is depleted.

11. The method of claim 8 further comprising billing the first carrier for connect charges when the call is built but before the subscriber is connected to another party.

12. The method of claim 8 further comprising receiving subscriber information from the first carrier and storing the subscriber information in a database.

13. The method of claim 12 wherein the step of identifying the subscriber as a valid subscriber of the first carrier comprises searching the database for information regarding the subscriber.

14. The method of claim 8 wherein the step of transmitting a message to the subscriber further comprises transmitting a request for the subscriber to replenish the subscriber's prepaid debit account.

15. In a cellular network including a first cellular carrier having a first geographical coverage area and second cellular carrier having a second geographic coverage area, a method of completing a roaming call from a subscriber of the first carrier placed from within the geographic coverage area of the second carrier, comprising:
  receiving a call from the subscriber at a mobile switching center of the second carrier, the subscriber having a prepaid debit account;
  notifying a roaming platform of the call placed by the subscriber from within the second carrier's geographical coverage area;
  receiving a communication from the roaming platform that the call is accepted; transmitting a message from the roaming platform to the subscriber, the message informing the subscriber of financial information within the prepaid debit account regarding the call connection before the subscriber's call is connected; and
  connecting the call from the subscriber wherein the subscriber is within the second geographical coverage area of the second cellular carrier;
  billing the first cellular carrier of the subscriber roaming charges beginning when the call is built; and
  charging the subscriber only for a portion of the roaming charges beginning when the subscriber is connected to the another party.

16. The method of claim 15 further comprising billing the first carrier for the call.

17. The method of claim 15 further comprising:
  selecting a preferred roaming platform from a stored list of authorized roaming platforms arranged in a priority order as to preference in a calling device of the roaming subscriber; and
  searching available cellular providers to determine if one or more of the stored authorized roaming platforms is available.

18. The method of claim 15 further comprising:
  selecting the authorized roaming platforms having the highest priority and initiating a call connection therewith; and
  the selected cellular provider operable to interface with the designated roaming platform to determine if the roaming subscriber is a valid subscriber and, if so, accepting the call and facilitating the call build.

19. A method of facilitating roaming calls between roaming subscribers of a cellular provider and other parties, comprising:
  selecting a roaming platform to process roaming calls between subscribers of the cellular provider and other parties;

identifying valid subscribers of the cellular provider to the roaming platform, such valid subscribers having a prepaid debit account; and wherein the roaming platform transmits a message to roaming subscribers including financial information within the prepaid debit account prior to connecting subscribers' roaming calls over a calling network;

receiving charges from the roaming platform wherein connect charges begin at least when a roaming calls is built; and charging a roaming subscriber only for a portion of the connect charges beginning when the roaming subscriber is connected to the another party.

20. The method of claim 19 further comprising debiting subscribers' prepaid debit accounts for roaming charges.

21. The method of claim 19 wherein the step of selecting a roaming platform further comprises selecting a plurality of preferred roaming platforms and identifying the preferred roaming platforms in a priority order as to preference in a list stored in subscribers' calling devices.

22. The method of claim 19 wherein the step of identifying valid subscribers of the cellular provider to the roaming platform further comprises transmitting subscriber data to the roaming platform wherein the roaming platform stores the subscriber information in a database for use when a subscriber places a roaming call.

23. The method of claim 19 wherein the subscribers are provided with the option of connecting or not connecting calls built by the roaming platform after the roaming platform has transmitted the message.

24. The method of claim 19 wherein the message includes a billing rate for a roaming call.

25. The method of claim 19 wherein the message includes minutes available for a roaming call based on the balance of a subscriber's prepaid debit account.

26. The method of claim 19, wherein the roaming subscribers are call originators of the roaming calls.

27. The method of claim 19 wherein the roaming subscribers are the recipients of the roaming calls.

28. A method of completing a financial transaction using a cellular network comprising:

building a call to a selected subscriber's calling device, the subscriber having a debit account with a cellular provider;

transmitting a message to the cellular subscriber's calling device, the message providing the subscriber with information regarding a balance within the debit account wherein the subscriber is provided the option of accepting the call by means of transmitting a code from the subscriber's calling device;

receiving a response from the subscriber, the response indicating whether the subscriber accepts or rejects the financial transaction;

connecting the subscriber to the call if the subscriber accepts the financial transaction;

billing a home network cellular provider for connect charges beginning when the call is built when the subscriber is within the calling area of a non-home network cellular provider; and charging the subscriber only a portion of the connect charges beginning when subscriber accepts the financial transaction.

29. The method of claim 28 further comprising maintaining a database of cellular subscribers having a debit account with a cellular provider.

30. The method of claim 28 further comprising debiting or crediting the subscriber's account if the subscriber accepts the financial transaction.

31. The method of claim 28 wherein the subscriber's account is credited in exchange for the subscriber taking a predetermined action.

32. The method of claim 31 wherein the predetermined action is receiving an advertisement.

33. The method of claim 31 wherein the predetermined action is responding to a survey.

34. The method of claim 28 wherein the subscriber is selected based on the subscriber's geographical location.

35. A method of advertising using a cellular network comprising:

building a call to one or more selected subscribers having a debit account;

transmitting a message to the cellular subscriber's calling device, the message providing the subscriber with information regarding the debit account wherein the subscriber is provided the option of accepting the call by means of transmitting a code from the subscriber's calling device;

receiving a response from the subscriber, the response indicating whether the subscriber accepts or rejects the call;

connecting the subscriber to the already built call if the subscriber accepts the financial transaction wherein the call comprises advertising;

providing the subscriber with an incentive if the subscriber accepts the call;

billing a home network cellular provider of the subscriber for connect charges beginning when the call is built when the subscriber is within the calling area of a non-home network cellular provider; and charging the subscriber only a portion of the connection charges beginning when the subscriber accepts the call.

36. The method of claim 35 wherein the incentive comprises a credit to the subscriber's debit account.

37. The method of claim 35 further comprising maintaining a database of cellular subscribers having a debit account with a cellular provider.

38. The method of claim 35 further comprising determining the geographical location of the subscriber's calling device.

39. The method of claim 38 wherein a subscriber is selected to receive a call based on the geographical location of the subscriber's calling device.

* * * * *